(12) United States Patent
Chen et al.

(10) Patent No.: US 11,830,209 B2
(45) Date of Patent: Nov. 28, 2023

(54) NEURAL NETWORK-BASED IMAGE STREAM MODIFICATION

(71) Applicant: Snap Inc., Santa Monica, CA (US)

(72) Inventors: Travis Chen, Los Angeles, CA (US); Samuel Edward Hare, Los Angeles, CA (US); Yuncheng Li, Los Angeles, CA (US); Tony Mathew, Los Angeles, CA (US); Jonathan Solichin, Arcadia, CA (US); Jianchao Yang, Los Angeles, CA (US); Ning Zhang, Los Angeles, CA (US)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 17/651,524

(22) Filed: Feb. 17, 2022

(65) Prior Publication Data
US 2022/0172448 A1 Jun. 2, 2022

Related U.S. Application Data

(63) Continuation of application No. 15/929,374, filed on Apr. 29, 2020, now Pat. No. 11,288,879, which is a
(Continued)

(51) Int. Cl.
*G06T 7/50* (2017.01)
*G06T 19/20* (2011.01)
(Continued)

(52) U.S. Cl.
CPC .................. *G06T 7/50* (2017.01); *G06T 7/20* (2013.01); *G06T 7/73* (2017.01); *G06T 19/006* (2013.01);
(Continued)

(58) Field of Classification Search
CPC .. G06T 19/20; G06T 7/73; G06T 7/20; G06T 19/006; G06T 2207/10016;
(Continued)

(56) References Cited

U.S. PATENT DOCUMENTS 5,754,939 A 5/1998 Herz et al.
5,880,731 A 3/1999 Liles et al.
(Continued)

FOREIGN PATENT DOCUMENTS

CA 2887596 A1 7/2015
CN 104156700 A 11/2014
(Continued)

OTHER PUBLICATIONS

"U.S. Appl. No. 15/929,374, Non Final Office Action dated Jul. 12, 2021", 31 pgs.
(Continued)

*Primary Examiner* — Jin Ge
(74) *Attorney, Agent, or Firm* — SCHWEGMAN LUNDBERG & WOESSNER, P.A.

(57) ABSTRACT

Systems, devices, media, and methods are presented for object detection and inserting graphical elements into an image stream in response to detecting the object. The systems and methods detect an object of interest in received frames of a video stream. The systems and methods identify a bounding box for the object of interest and estimate a three-dimensional position of the object of interest based on a scale of the object of interest. The systems and methods generate one or more graphical elements having a size based on the scale of the object of interest and a position based on the three-dimensional position estimated for the object of interest. The one or more graphical elements are generated within the video stream to form a modified video stream. The systems and methods cause presentation of the modified
(Continued)

video stream including the object of interest and the one or more graphical elements.

20 Claims, 12 Drawing Sheets

Related U.S. Application Data continuation of application No. 15/990,318, filed on May 25, 2018, now Pat. No. 10,679,428.

(60) Provisional application No. 62/511,833, filed on May 26, 2017.

(51) Int. Cl.
| | | |
|---|---|---|
| *G06T 7/20* | (2017.01) | |
| *G06T 19/00* | (2011.01) | |
| *G06T 7/73* | (2017.01) | |
| *G06V 10/20* | (2022.01) | |
| *G06V 20/20* | (2022.01) | |
| *G06V 20/40* | (2022.01) | |
| *G06V 10/764* | (2022.01) | |
| *G06V 20/64* | (2022.01) | |

(52) U.S. Cl.
CPC ............ *G06T 19/20* (2013.01); *G06V 10/255* (2022.01); *G06V 10/764* (2022.01); *G06V 20/20* (2022.01); *G06V 20/40* (2022.01); *G06V 20/64* (2022.01); *G06T 2207/10016* (2013.01); *G06T 2207/20084* (2013.01); *G06T 2210/12* (2013.01); *G06T 2219/2016* (2013.01)

(58) Field of Classification Search
CPC .. G06T 2207/20084; G06T 2219/2016; G06V 20/20; G06V 20/40; G06V 10/255
USPC ......................................................... 345/629
See application file for complete search history.

(56) References Cited

U.S. PATENT DOCUMENTS

| | | | |
|---|---|---|---|
| 6,023,270 | A | 2/2000 | Brush, II et al. |
| 6,038,295 | A | 3/2000 | Mattes |
| 6,158,044 | A | 12/2000 | Tibbetts |
| 6,167,435 | A | 12/2000 | Druckenmiller et al. |
| 6,205,432 | B1 | 3/2001 | Gabbard et al. |
| 6,223,165 | B1 | 4/2001 | Lauffer |
| 6,310,694 | B1 | 10/2001 | Okimoto et al. |
| 6,484,196 | B1 | 11/2002 | Maurille |
| 6,487,586 | B2 | 11/2002 | Ogilvie et al. |
| 6,665,531 | B1 | 12/2003 | Soderbacka Lauri et al. |
| 6,701,347 | B1 | 3/2004 | Ogilvie |
| 6,711,608 | B1 | 3/2004 | Ogilvie |
| 6,757,713 | B1 | 6/2004 | Ogilvie et al. |
| 6,772,195 | B1 | 8/2004 | Hatlelid et al. |
| 6,842,779 | B1 | 1/2005 | Nishizawa |
| 6,980,909 | B2 | 12/2005 | Root et al. |
| 7,113,917 | B2 | 9/2006 | Jacobi et al. |
| 7,124,164 | B1 | 10/2006 | Chemtob |
| 7,149,893 | B1 | 12/2006 | Leonard et al. |
| 7,173,651 | B1 | 2/2007 | Knowles |
| 7,243,163 | B1 | 7/2007 | Friend et al. |
| 7,278,168 | B1 | 10/2007 | Chaudhury et al. |
| 7,342,587 | B2 | 3/2008 | Danzig et al. |
| 7,356,564 | B2 | 4/2008 | Hartselle et al. |
| 7,376,715 | B2 | 5/2008 | Cunningham et al. |
| 7,391,900 | B2 | 6/2008 | Kim et al. |
| 7,411,493 | B2 | 8/2008 | Smith |
| 7,468,729 | B1 | 12/2008 | Levinson |
| 7,478,402 | B2 | 1/2009 | Christensen et al. |
| 7,496,347 | B2 | 2/2009 | Puranik |
| 7,519,670 | B2 | 4/2009 | Hagale et al. |
| 7,535,890 | B2 | 5/2009 | Rojas |
| 7,607,096 | B2 | 10/2009 | Oreizy et al. |
| 7,636,755 | B2 | 12/2009 | Blattner et al. |
| 7,639,251 | B2 | 12/2009 | Gu et al. |
| 7,703,140 | B2 | 4/2010 | Nath et al. |
| 7,775,885 | B2 | 8/2010 | Van Luchene et al. |
| 7,859,551 | B2 | 12/2010 | Bulman et al. |
| 7,885,931 | B2 | 2/2011 | Seo et al. |
| 7,912,896 | B2 | 3/2011 | Wolovitz et al. |
| 7,925,703 | B2 | 4/2011 | Dinan et al. |
| 8,088,044 | B2 | 1/2012 | Tchao |
| 8,095,878 | B2 | 1/2012 | Bates et al. |
| 8,108,774 | B2 | 1/2012 | Finn et al. |
| 8,117,281 | B2 | 2/2012 | Robinson et al. |
| 8,130,219 | B2 | 3/2012 | Fleury et al. |
| 8,131,597 | B2 | 3/2012 | Hudetz |
| 8,146,005 | B2 | 3/2012 | Jones et al. |
| 8,151,191 | B2 | 4/2012 | Nicol |
| 8,170,957 | B2 | 5/2012 | Richard |
| 8,199,747 | B2 | 6/2012 | Rojas et al. |
| 8,214,443 | B2 | 7/2012 | Hamburg |
| 8,238,947 | B2 | 8/2012 | Lottin et al. |
| 8,244,593 | B2 | 8/2012 | Klinger et al. |
| 8,312,097 | B1 | 11/2012 | Siegel et al. |
| 8,332,475 | B2 | 12/2012 | Rosen et al. |
| 8,384,719 | B2 | 2/2013 | Reville et al. |
| RE44,054 | E | 3/2013 | Kim |
| 8,396,708 | B2 | 3/2013 | Park et al. |
| 8,425,322 | B2 | 4/2013 | Gillo et al. |
| 8,458,601 | B2 | 6/2013 | Castelli et al. |
| 8,462,198 | B2 | 6/2013 | Lin et al. |
| 8,484,158 | B2 | 7/2013 | Deluca et al. |
| 8,495,503 | B2 | 7/2013 | Brown et al. |
| 8,495,505 | B2 | 7/2013 | Smith et al. |
| 8,504,926 | B2 | 8/2013 | Wolf |
| 8,559,980 | B2 | 10/2013 | Pujol |
| 8,564,621 | B2 | 10/2013 | Branson et al. |
| 8,564,710 | B2 | 10/2013 | Nonaka et al. |
| 8,570,907 | B2 | 10/2013 | Garcia, Jr. et al. |
| 8,581,911 | B2 | 11/2013 | Becker et al. |
| 8,597,121 | B2 | 12/2013 | del Valle |
| 8,601,051 | B2 | 12/2013 | Wang |
| 8,601,379 | B2 | 12/2013 | Marks et al. |
| 8,632,408 | B2 | 1/2014 | Gillo et al. |
| 8,648,865 | B2 | 2/2014 | Dawson et al. |
| 8,659,548 | B2 | 2/2014 | Hildreth |
| 8,683,354 | B2 | 3/2014 | Khandelwal et al. |
| 8,692,830 | B2 | 4/2014 | Nelson et al. |
| 8,718,333 | B2 | 5/2014 | Wolf et al. |
| 8,724,622 | B2 | 5/2014 | Rojas |
| 8,745,132 | B2 | 6/2014 | Obradovich |
| 8,810,513 | B2 | 8/2014 | Ptucha et al. |
| 8,812,171 | B2 | 8/2014 | Filev et al. |
| 8,832,201 | B2 | 9/2014 | Wall |
| 8,832,552 | B2 | 9/2014 | Arrasvuori et al. |
| 8,839,327 | B2 | 9/2014 | Amento et al. |
| 8,874,677 | B2 | 10/2014 | Rosen et al. |
| 8,890,926 | B2 | 11/2014 | Tandon et al. |
| 8,892,999 | B2 | 11/2014 | Nims et al. |
| 8,909,679 | B2 | 12/2014 | Root et al. |
| 8,909,714 | B2 | 12/2014 | Agarwal et al. |
| 8,909,725 | B1 | 12/2014 | Sehn |
| 8,914,752 | B1 | 12/2014 | Spiegel |
| 8,924,250 | B2 | 12/2014 | Bates et al. |
| 8,963,926 | B2 | 2/2015 | Brown et al. |
| 8,989,786 | B2 | 3/2015 | Feghali |
| 8,995,433 | B2 | 3/2015 | Rojas |
| 9,040,574 | B2 | 5/2015 | Wang et al. |
| 9,055,416 | B2 | 6/2015 | Rosen et al. |
| 9,083,770 | B1 | 7/2015 | Drose et al. |
| 9,086,776 | B2 | 7/2015 | Ye et al. |
| 9,094,137 | B1 | 7/2015 | Sehn et al. |
| 9,100,806 | B2 | 8/2015 | Rosen et al. |
| 9,100,807 | B2 | 8/2015 | Rosen et al. |
| 9,105,014 | B2 | 8/2015 | Collet et al. |
| 9,113,301 | B1 | 8/2015 | Spiegel et al. |
| 9,148,424 | B1 | 9/2015 | Yang |
| 9,159,166 | B2 | 10/2015 | Finn et al. |
| 9,160,993 | B1 * | 10/2015 | Lish ..................... G06F 3/0488 |

(56) References Cited

U.S. PATENT DOCUMENTS

| | | |
|---|---|---|
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,237,202 B1 | 1/2016 | Sehn |
| 9,241,184 B2 | 1/2016 | Weerasinghe |
| 9,256,860 B2 | 2/2016 | Herger et al. |
| 9,264,463 B2 | 2/2016 | Rubinstein et al. |
| 9,276,886 B1 | 3/2016 | Samaranayake |
| 9,294,425 B1 | 3/2016 | Son |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,385,983 B1 | 7/2016 | Sehn |
| 9,396,354 B1 | 7/2016 | Murphy et al. |
| 9,402,057 B2 | 7/2016 | Kaytaz et al. |
| 9,407,712 B1 | 8/2016 | Sehn |
| 9,407,816 B1 | 8/2016 | Sehn |
| 9,412,192 B2 | 8/2016 | Mandel et al. |
| 9,430,783 B1 | 8/2016 | Sehn |
| 9,443,227 B2 | 9/2016 | Evans et al. |
| 9,460,541 B2 | 10/2016 | Li et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,489,760 B2 | 11/2016 | Li et al. |
| 9,491,134 B2 | 11/2016 | Rosen et al. |
| 9,503,845 B2 | 11/2016 | Vincent |
| 9,508,197 B2 | 11/2016 | Quinn |
| 9,532,171 B2 | 12/2016 | Allen et al. |
| 9,537,811 B2 | 1/2017 | Allen et al. |
| 9,544,257 B2 | 1/2017 | Ogundokun et al. |
| 9,560,006 B2 | 1/2017 | Prado et al. |
| 9,576,400 B2 | 2/2017 | Van Os |
| 9,589,357 B2 | 3/2017 | Li et al. |
| 9,592,449 B2 | 3/2017 | Barbalet et al. |
| 9,628,950 B1 | 4/2017 | Noeth et al. |
| 9,648,376 B2 | 5/2017 | Chang et al. |
| 9,652,896 B1 | 5/2017 | Jurgenson et al. |
| 9,659,244 B2 | 5/2017 | Anderton et al. |
| 9,693,191 B2 | 6/2017 | Sehn |
| 9,697,635 B2 | 7/2017 | Quinn et al. |
| 9,705,831 B2 | 7/2017 | Spiegel |
| 9,706,040 B2 | 7/2017 | Kadirvel et al. |
| 9,742,713 B2 | 8/2017 | Spiegel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,785,796 B1 | 10/2017 | Murphy et al. |
| 9,792,714 B2 | 10/2017 | Li et al. |
| 9,825,898 B2 | 11/2017 | Sehn |
| 9,839,844 B2 | 12/2017 | Dunstan et al. |
| 9,854,219 B2 | 12/2017 | Sehn |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,961,520 B2 | 5/2018 | Brooks et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,133,951 B1* | 11/2018 | Mendonca .............. G06V 20/62 |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,362,219 B2 | 7/2019 | Wilson et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,657,701 B2 | 5/2020 | Osman et al. |
| 10,679,428 B1 | 6/2020 | Chen et al. |
| 11,210,863 B1 | 12/2021 | Yan et al. |
| 11,288,879 B2 | 3/2022 | Chen et al. |
| 2002/0047868 A1 | 4/2002 | Miyazawa |
| 2002/0067362 A1 | 6/2002 | Agostino Nocera et al. |
| 2002/0144154 A1 | 10/2002 | Tomkow |
| 2002/0169644 A1 | 11/2002 | Greene |
| 2003/0052925 A1 | 3/2003 | Daimon et al. |
| 2003/0126215 A1 | 7/2003 | Udell et al. |
| 2003/0217106 A1 | 11/2003 | Adar et al. |
| 2004/0203959 A1 | 10/2004 | Coombes |
| 2005/0097176 A1 | 5/2005 | Schatz et al. |
| 2005/0162419 A1 | 7/2005 | Kim et al. |
| 2005/0198128 A1 | 9/2005 | Anderson et al. |
| 2005/0206610 A1 | 9/2005 | Cordelli |
| 2005/0223066 A1 | 10/2005 | Buchheit et al. |
| 2006/0242239 A1 | 10/2006 | Morishima et al. |
| 2006/0270419 A1 | 11/2006 | Crowley et al. |
| 2006/0294465 A1 | 12/2006 | Ronen et al. |
| 2007/0038715 A1 | 2/2007 | Collins et al. |
| 2007/0064899 A1 | 3/2007 | Boss et al. |
| 2007/0073823 A1 | 3/2007 | Cohen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki |
| 2007/0214216 A1 | 9/2007 | Carrer et al. |
| 2007/0233801 A1 | 10/2007 | Eren et al. |
| 2008/0055269 A1 | 3/2008 | Lemay et al. |
| 2008/0071559 A1 | 3/2008 | Arrasvuori |
| 2008/0120409 A1 | 5/2008 | Sun et al. |
| 2008/0158222 A1 | 7/2008 | Li et al. |
| 2008/0207176 A1 | 8/2008 | Brackbill et al. |
| 2008/0252723 A1* | 10/2008 | Park ........................ G06T 7/238 348/143 |
| 2008/0270938 A1 | 10/2008 | Carlson |
| 2008/0306826 A1 | 12/2008 | Kramer et al. |
| 2008/0313346 A1 | 12/2008 | Kujawa et al. |
| 2009/0016617 A1 | 1/2009 | Bregman-Amitai et al. |
| 2009/0042588 A1 | 2/2009 | Lottin et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0132453 A1 | 5/2009 | Hangartner et al. |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0082427 A1 | 4/2010 | Burgener et al. |
| 2010/0115426 A1 | 5/2010 | Liu et al. |
| 2010/0131880 A1 | 5/2010 | Lee et al. |
| 2010/0162149 A1 | 6/2010 | Sheleheda et al. |
| 2010/0185665 A1 | 7/2010 | Horn et al. |
| 2010/0203968 A1 | 8/2010 | Gill et al. |
| 2010/0227682 A1 | 9/2010 | Reville et al. |
| 2010/0306669 A1 | 12/2010 | Della Pasqua |
| 2011/0093780 A1 | 4/2011 | Dunn |
| 2011/0099507 A1 | 4/2011 | Nesladek et al. |
| 2011/0115798 A1 | 5/2011 | Nayar et al. |
| 2011/0145564 A1 | 6/2011 | Moshir et al. |
| 2011/0148864 A1 | 6/2011 | Lee et al. |
| 2011/0202598 A1 | 8/2011 | Evans et al. |
| 2011/0213845 A1 | 9/2011 | Logan et al. |
| 2011/0239136 A1 | 9/2011 | Goldman et al. |
| 2011/0286586 A1 | 11/2011 | Saylor et al. |
| 2011/0320373 A1 | 12/2011 | Lee et al. |
| 2012/0028659 A1 | 2/2012 | Whitney et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2012/0184248 A1 | 7/2012 | Speede |
| 2012/0209921 A1 | 8/2012 | Adafin et al. |
| 2012/0209924 A1 | 8/2012 | Evans et al. |

(56) References Cited

U.S. PATENT DOCUMENTS

| | | |
|---|---|---|
| 2012/0254325 A1 | 10/2012 | Majeti et al. |
| 2012/0278692 A1 | 11/2012 | Shi |
| 2012/0304080 A1 | 11/2012 | Wormald et al. |
| 2013/0071093 A1 | 3/2013 | Hanks et al. |
| 2013/0103760 A1 | 4/2013 | Golding et al. |
| 2013/0194301 A1 | 8/2013 | Robbins et al. |
| 2013/0201187 A1 | 8/2013 | Tong et al. |
| 2013/0249948 A1 | 9/2013 | Reitan |
| 2013/0257877 A1 | 10/2013 | Davis |
| 2013/0290443 A1 | 10/2013 | Collins et al. |
| 2014/0032682 A1 | 1/2014 | Prado et al. |
| 2014/0043329 A1 | 2/2014 | Wang et al. |
| 2014/0055554 A1 | 2/2014 | Du et al. |
| 2014/0122787 A1 | 5/2014 | Shalvi et al. |
| 2014/0125678 A1 | 5/2014 | Wang et al. |
| 2014/0129343 A1 | 5/2014 | Finster et al. |
| 2014/0201527 A1 | 7/2014 | Krivorot |
| 2014/0282096 A1 | 9/2014 | Rubinstein et al. |
| 2014/0317659 A1 | 10/2014 | Yasutake |
| 2014/0325383 A1 | 10/2014 | Brown et al. |
| 2014/0359024 A1 | 12/2014 | Spiegel |
| 2014/0359032 A1 | 12/2014 | Spiegel et al. |
| 2015/0052465 A1* | 2/2015 | Altin .................. G06F 3/04883 715/822 |
| 2015/0103174 A1* | 4/2015 | Emura .................. G06V 20/58 348/148 |
| 2015/0193982 A1 | 7/2015 | Mihelich et al. |
| 2015/0199082 A1 | 7/2015 | Scholler et al. |
| 2015/0206349 A1 | 7/2015 | Rosenthal et al. |
| 2015/0227602 A1 | 8/2015 | Ramu et al. |
| 2015/0276379 A1 | 10/2015 | Ni et al. |
| 2016/0085773 A1 | 3/2016 | Chang et al. |
| 2016/0085863 A1 | 3/2016 | Allen et al. |
| 2016/0086670 A1 | 3/2016 | Gross et al. |
| 2016/0099901 A1 | 4/2016 | Allen et al. |
| 2016/0134840 A1 | 5/2016 | Mcculloch |
| 2016/0180887 A1 | 6/2016 | Sehn |
| 2016/0234149 A1 | 8/2016 | Tsuda et al. |
| 2016/0234151 A1* | 8/2016 | Son ........................ H04L 51/234 |
| 2016/0277419 A1 | 9/2016 | Allen et al. |
| 2016/0321708 A1 | 11/2016 | Sehn |
| 2016/0359957 A1 | 12/2016 | Laliberte |
| 2016/0359987 A1 | 12/2016 | Laliberte |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0147905 A1 | 5/2017 | Huang et al. |
| 2017/0154425 A1 | 6/2017 | Pierce et al. |
| 2017/0161382 A1 | 6/2017 | Ouimet et al. |
| 2017/0199855 A1 | 7/2017 | Fishbeck |
| 2017/0220863 A1 | 8/2017 | Lection et al. |
| 2017/0235848 A1 | 8/2017 | Van Dusen et al. |
| 2017/0263029 A1 | 9/2017 | Yan et al. |
| 2017/0287006 A1 | 10/2017 | Azmoodeh et al. |
| 2017/0295250 A1 | 10/2017 | Samaranayake et al. |
| 2017/0310934 A1 | 10/2017 | Du et al. |
| 2017/0312634 A1 | 11/2017 | Ledoux et al. |
| 2017/0374003 A1 | 12/2017 | Allen et al. |
| 2017/0374508 A1 | 12/2017 | Davis et al. |
| 2018/0012082 A1* | 1/2018 | Satazoda .............. G06V 10/763 |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0121762 A1 | 5/2018 | Han et al. |
| 2018/0136000 A1 | 5/2018 | Rasmusson, Jr. et al. |
| 2018/0137642 A1 | 5/2018 | Malisiewicz et al. |
| 2018/0137644 A1 | 5/2018 | Rad et al. |
| 2018/0189532 A1 | 7/2018 | Bataller et al. |
| 2018/0225517 A1 | 8/2018 | Holzer et al. |
| 2018/0247138 A1 | 8/2018 | Kang |
| 2018/0300880 A1* | 10/2018 | Fan ....................... G06V 20/582 |
| 2018/0315076 A1 | 11/2018 | Andreou |
| 2018/0315133 A1 | 11/2018 | Brody et al. |
| 2018/0315134 A1 | 11/2018 | Amitay et al. |
| 2018/0341386 A1* | 11/2018 | Inomata ................ A63F 13/211 |
| 2019/0001223 A1 | 1/2019 | Blackstock et al. |
| 2019/0057616 A1 | 2/2019 | Cohen et al. |
| 2019/0188920 A1 | 6/2019 | Mcphee et al. |
| 2019/0378204 A1 | 12/2019 | Ayush et al. |
| 2020/0258313 A1 | 8/2020 | Chen et al. |
| 2022/0327608 A1 | 10/2022 | Assouline et al. |
| 2023/0214900 A1 | 7/2023 | Assouline et al. |

FOREIGN PATENT DOCUMENTS

| | | |
|---|---|---|
| CN | 103390287 B | 8/2018 |
| CN | 109863532 A | 6/2019 |
| CN | 110168478 A | 8/2019 |
| CN | 106778453 B | 5/2020 |
| EP | 2184092 A2 | 5/2010 |
| EP | 3155560 B1 | 5/2020 |
| JP | 2001230801 A | 8/2001 |
| JP | 5497931 B2 | 3/2014 |
| KR | 101445263 B1 | 9/2014 |
| WO | WO-2003094072 A1 | 11/2003 |
| WO | WO-2004095308 A1 | 11/2004 |
| WO | WO-2006107182 A1 | 10/2006 |
| WO | WO-2007089020 A1 | 8/2007 |
| WO | WO-2007134402 A1 | 11/2007 |
| WO | WO-2012000107 A1 | 1/2012 |
| WO | WO-2012139276 A1 | 10/2012 |
| WO | WO-2013008251 A2 | 1/2013 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194262 A2 | 12/2014 |
| WO | WO-2014194439 A1 | 12/2014 |
| WO | WO-2015192026 A1 | 12/2015 |
| WO | WO-2016054562 A1 | 4/2016 |
| WO | WO-2016065131 A1 | 4/2016 |
| WO | WO-2016090605 A1 | 6/2016 |
| WO | WO-2016/112299 A1 | 7/2016 |
| WO | WO-2016179166 A1 | 11/2016 |
| WO | WO-2016179235 A1 | 11/2016 |
| WO | WO-2017132689 A1 | 8/2017 |
| WO | WO-2017176739 A1 | 10/2017 |
| WO | WO-2017176992 A1 | 10/2017 |
| WO | WO-2018005644 A1 | 1/2018 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |
| WO | 2023129372 | 7/2023 |
| WO | 2023129442 | 7/2023 |

OTHER PUBLICATIONS

"U.S. Appl. No. 15/929,374, Notice of Allowance dated Nov. 19, 2021", 9 pgs.

"U.S. Appl. No. 15/929,374, Response filed Oct. 12, 2021 to Non Final Office Action dated Jul. 12, 2021", 10 pgs.

"U.S. Appl. No. 15/990,318, Non Final Office Action dated Oct. 8, 2019", 20 pgs.

"U.S. Appl. No. 15/990,318, Notice of Allowance dated Jan. 30, 2020", 8 pgs.

"U.S. Appl. No. 15/990,318, Response filed Jan. 6, 20 to Non Final Office Action dated Oct. 8, 2019", 11 pgs.

Castelluccia, Claude, et al., "EphPub: Toward robust Ephemeral Publishing", 19th IEEE International Conference on Network Protocols (ICNP), (Oct. 17, 2011), 18 pgs.

Fajman, "An Extensible Message Format for Message Disposition Notifications", Request for Comments: 2298, National Institutes of Health, (Mar. 1998), 28 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.

(56) References Cited

OTHER PUBLICATIONS

Sawers, Paul, "Snapchat for iOS Lets You Send Photos to Friends and Set How long They're Visible For", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.

Shein, Esther, "Ephemeral Data", Communications of the ACM, vol. 56, No. 9, (Sep. 2013), 3 pgs.

Vaas, Lisa, "Stealth Text, Should You Choose to Accept It", [Online] Retrieved from the Internet: <URL: http://www.eweek.com/print/c/a/MessagingandCollaboration/StealthTextShouldYouChoosetoAcceptIt>, (Dec. 13, 2005), 2 pgs.

"International Application Serial No. PCT/US2022/053622, Invitation to Pay Additional Fees mailed Apr. 28, 2023", 7 pgs.

Roman, Suvorov, et al., "Resolution-robust Large Mask Inpainting with Fourier Convolutions", Arxiv.Org, Cornell University Library, 201 Olin Library Cornell University Ithaca, NY, (Sep. 15, 2021), 1-16.

"International Application Serial No. PCT/US2022/052696, Invitation to Pay Additional Fees dated Jun. 13, 2023", 5 pgs.

"International Application Serial No. PCT/US2022/053622, International Search Report dated Jun. 23, 2023", 5 pgs.

"International Application Serial No. PCT/US2022/053622, Written Opinion dated Jun. 23, 2023", 10 pgs.

Breen, D. E, "Interactive occlusion and automatic object placement for augmented reality", Computer Graphics Forum : Journal of the European Association for Computer Graphics, Wiley-Blackwell, Oxford, vol. 15, No. 3, XP002515919, (Aug. 26, 1996), 11-22.

U.S. Appl. No. 17/937,153, filed Sep. 30, 2022, 9-DOF Object Tracking.

\* cited by examiner

NEURAL NETWORK-BASED IMAGE STREAM MODIFICATION

CLAIM OF PRIORITY

This application is a continuation of U.S. patent application Ser. No. 15/929,374, filed on Apr. 29, 2020, which is a continuation of U.S. patent application Ser. No. 15/990,318, filed on May 25, 2018, now issued as U.S. Pat. No. 10,679,428, which claims the benefit of priority to U.S. Provisional Application Ser. No. 62/511,833, filed on May 26, 2017, each of which are incorporated herein by reference in their entireties.

TECHNICAL FIELD

Embodiments of the present disclosure relate generally to modification of an image stream. More particularly, but not by way of limitation, the present disclosure addresses systems and methods for neural network-based object detection and inserting graphical elements into an image stream in response to detecting the object.

BACKGROUND

Telecommunications applications and devices can provide communication between multiple users using a variety of media, such as text, images, sound recordings, and/or video recordings. For example, video conferencing allows two or more individuals to communicate with each other using a combination of software applications, telecommunications devices, and a telecommunications network. Telecommunications devices may also record video streams to transmit as messages across a telecommunications network.

Currently, object detection techniques used for communication or identification purposes are often guided by user selection. Object recognition techniques generally train models on individual features, such that training of a first model for a first feature appearing on an object is conducted separately from training of a second model for a second feature on the object. When modeling or performing recognition functions on a new object, the separately trained models are generally used independently in some succession to construct the model or recognition of the new object.

BRIEF DESCRIPTION OF THE DRAWINGS

Various ones of the appended drawings merely illustrate example embodiments of the present disclosure and should not be considered as limiting its scope.

Figure 1:
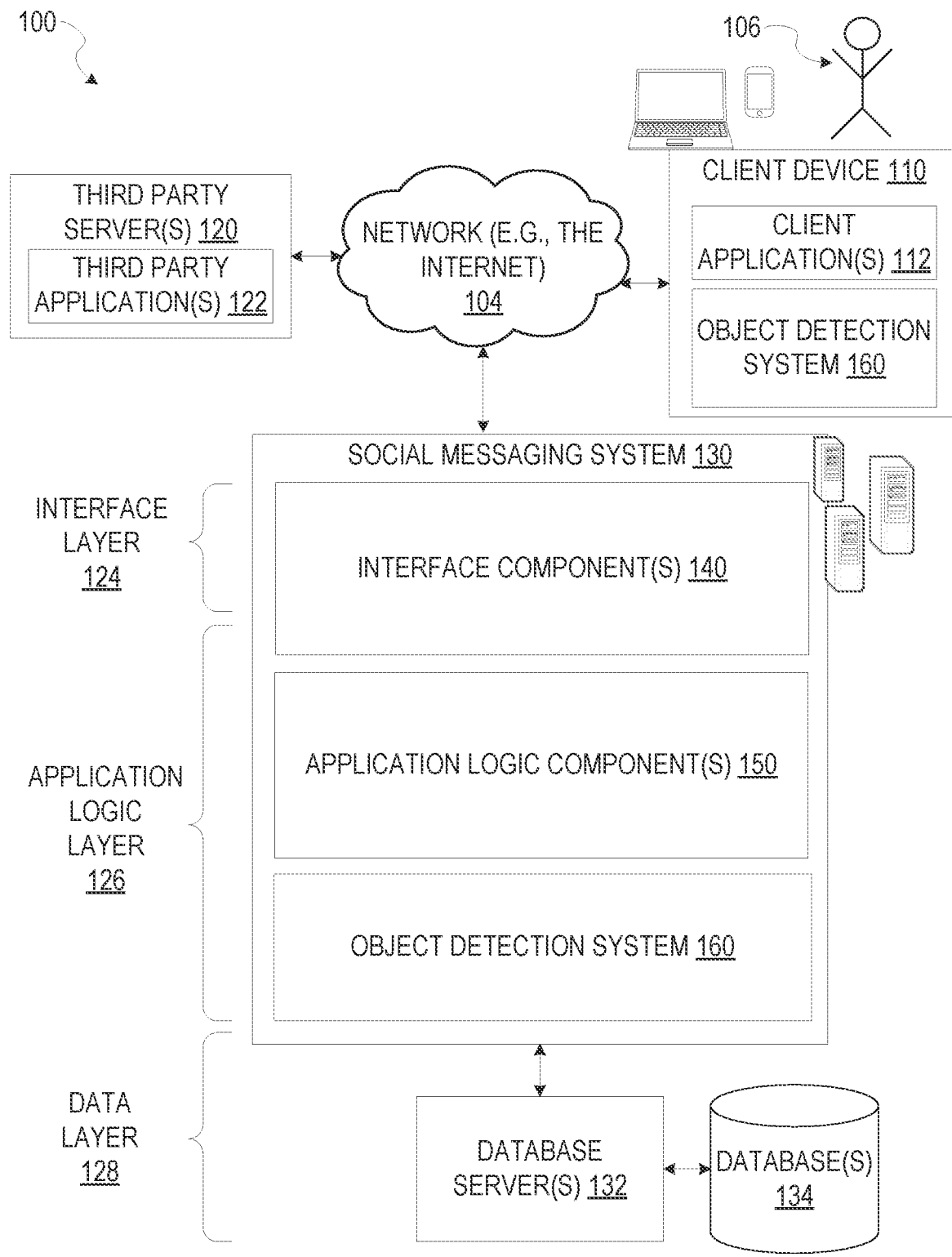
FIG. 1 is a block diagram illustrating a network system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

The present disclosure describes a neural network-based object detection and video stream modification system. The neural network-based object detection system may provide a virtual bounding box around an object of interest, such as a person, while an object detection application is active. The bounding box indicates an area in which the person has been detected. Graphics, such as an effect or an object, may be positioned and rendered relative to the person. The bounding box may be used to track the person during movement of the person within a field of view of the image capture device capturing the video stream.

An object detection system, described herein, may operate on a client device such as a smartphone or other mobile computing device. In some embodiments, the object detection system may detect an object at an object level, without analyzing or identifying user-level facial, body, or other identifying features.

The object detection system may operate in cooperation with or as part of an image modification application. Upon opening the image modification application, a user is presented with a preview of a field of view of an image capture device. The image modification application may also present an initial graphics presentation. The graphics presentation may include augmented-reality elements presented within the field of view of the image capture device. The augmented-reality elements may be configured to operate with a predefined object type. The image modification application and the object detection system identify an object of interest and generate a bounding box around the object of interest.

The augmented-reality elements are then generated or rendered relative to the object of interest within the field of view of the image capture device.

The above is one specific example. The various embodiments of the present disclosure relate to devices and instructions executed by one or more processors of a device to detect objects using a neural network model and generate graphical elements corresponding to the objects. An object detection system is described that is capable of generating an augmented-reality experience or presentation relative to an object. The augmented-reality experience or presentation may be presented on a mobile device, such as a smartphone, condensed and transmitted as a message or video stream, or presented in any other suitable manner.

FIG. 1 is a block diagram depicting a network system 100 having a client-server architecture configured for exchanging data over a network, according to one embodiment. For example, the network system 100 may be a messaging system where clients communicate and exchange data within the network system 100. The data may pertain to various functions (e.g., sending and receiving text and media communication, determining geolocation, etc.) and aspects (e.g., transferring communications data, receiving and transmitting indications of communication sessions, etc.) associated with the network system 100 and its users. Although the network system 100 is illustrated herein as having a client-server architecture, other embodiments may include other network architectures, such as peer-to-peer or distributed network environments.

As shown in FIG. 1, the network system 100 includes a social messaging system 130. The social messaging system 130 is generally based on a three-tiered architecture, consisting of an interface layer 124, an application logic layer 126, and a data layer 128. As is understood by skilled artisans in the relevant computer and Internet-related arts, each component or engine shown in FIG. 1 represents a set of executable software instructions and the corresponding hardware (e.g., memory and processor) for executing the instructions, forming a hardware-implemented component or engine and acting, at the time of the execution of the instructions, as a special-purpose machine configured to carry out a particular set of functions. To avoid obscuring the inventive subject matter with unnecessary detail, various functional components and engines that are not germane to conveying an understanding of the inventive subject matter have been omitted from FIG. 1. Of course, additional functional components and engines may be used with a social messaging system, such as that illustrated in FIG. 1, to facilitate additional functionality that is not specifically described herein. Furthermore, the various functional components and engines depicted in FIG. 1 may reside on a single server computer or client device, or may be distributed across several server computers or client devices in various arrangements. Moreover, although the social messaging system 130 is depicted in FIG. 1 as having a three-tiered architecture, the inventive subject matter is by no means limited to such an architecture.

As shown in FIG. 1, the interface layer 124 consists of interface component(s) (e.g., a web server) 140, which receive requests from various client-computing devices and servers, such as a client device 110 executing client application(s) 112, and third-party server(s) 120 executing third-party application(s) 122. In response to received requests, the interface component(s) 140 communicate appropriate responses to requesting devices via a network 104. For example, the interface component(s) 140 can receive requests such as Hypertext Transfer Protocol (HTTP) requests, or other web-based, application programming interface (API) requests.

The client device 110 can execute conventional web browser applications or applications (also referred to as "apps") that have been developed for a specific platform to include any of a wide variety of mobile computing devices and mobile-specific operating systems (e.g., IOS™, ANDROID™, WINDOWS® PHONE). Further, in some example embodiments, the client device 110 forms all or part of an object detection system 160, such that components of the object detection system 160 configure the client device 110 to perform a specific set of functions with respect to operations of the object detection system 160.

In an example, the client device 110 is executing the client application(s) 112. The client application(s) 112 can provide functionality to present information to a user 106 and communicate via the network 104 to exchange information with the social messaging system 130. Further, in some examples, the client device 110 executes functionality of the object detection system 160 to perform neural network-based object detection and image stream modification.

Each client device 110 can comprise a computing device that includes at least a display and communication capabilities with the network 104 to access the social messaging system 130, other client devices, and third-party server(s) 120. Client devices 110 comprise, but are not limited to, remote devices, work stations, computers, general-purpose computers, Internet appliances, hand-held devices, wireless devices, portable devices, wearable computers, cellular or mobile phones, personal digital assistants (PDAs), smartphones, tablets, ultrabooks, netbooks, laptops, desktops, multi-processor systems, microprocessor-based or programmable consumer electronics, game consoles, set-top boxes, network PCs, mini-computers, and the like. The user 106 can be a person, a machine, or other means of interacting with the client device 110. In some embodiments, the user 106 interacts with the social messaging system 130 via the client device 110. The user 106 may not be part of the network system 100, but may be associated with the client device 110.

As shown in FIG. 1, the data layer 128 has database server(s) 132 that facilitate access to information storage repositories or database(s) 134. The database(s) 134 are storage devices that store data such as member profile data, social graph data (e.g., relationships between members of the social messaging system 130), image modification preference data, accessibility data, and other user data.

An individual can register with the social messaging system 130 to become a member of the social messaging system 130. Once registered, a member can form social network relationships (e.g., friends, followers, or contacts) on the social messaging system 130 and interact with a broad range of applications provided by the social messaging system 130.

The application logic layer 126 includes various application logic components 150, which, in conjunction with the interface component(s) 140, generate various user interfaces with data retrieved from various data sources or data services in the data layer 128. Individual application logic components 150 may be used to implement the functionality associated with various applications, services, and features of the social messaging system 130. For instance, a social messaging application can be implemented with at least a portion of the application logic components 150. The social messaging application provides a messaging mechanism for users of the client devices 110 to send and receive messages that include text and media content such as pictures and video. The client devices 110 may access and view the messages from the social messaging application for a specified period of time (e.g., limited or unlimited). In an example, a particular message is accessible to a message recipient for a predefined duration (e.g., specified by a message sender) that begins when the particular message is first accessed. After the predefined duration elapses, the message is deleted and is no longer accessible to the message recipient. Of course, other applications and services may be separately embodied in their own application logic components 150.

As illustrated in FIG. 1, the social messaging system 130 may include at least a portion of the object detection system 160 capable of neural network-based object detection and image stream modification. Similarly, the client device 110 includes at least a portion of the object detection system 160, as described above. In other examples, the client device 110 may include the entirety of the object detection system 160. In instances where the client device 110 includes a portion of (or all of) the object detection system 160, the client device 110 can work alone or in cooperation with the social messaging system 130 to provide the functionality of the object detection system 160 described herein.

In some embodiments, the social messaging system 130 may be an ephemeral message system that enables ephemeral communications where content (e.g., video clips or images) is deleted following a deletion trigger event such as a viewing time or viewing completion. In such embodiments, a device uses the various components described herein within the context of any of generating, sending, receiving, or displaying aspects of an ephemeral message. For example, a device implementing the object detection system 160 may perform neural network-based object detection and image stream modification. The device may detect objects in an image stream and modify the image stream in real time or near-real time as a part of a generation of content for an ephemeral message.

Figure 2:
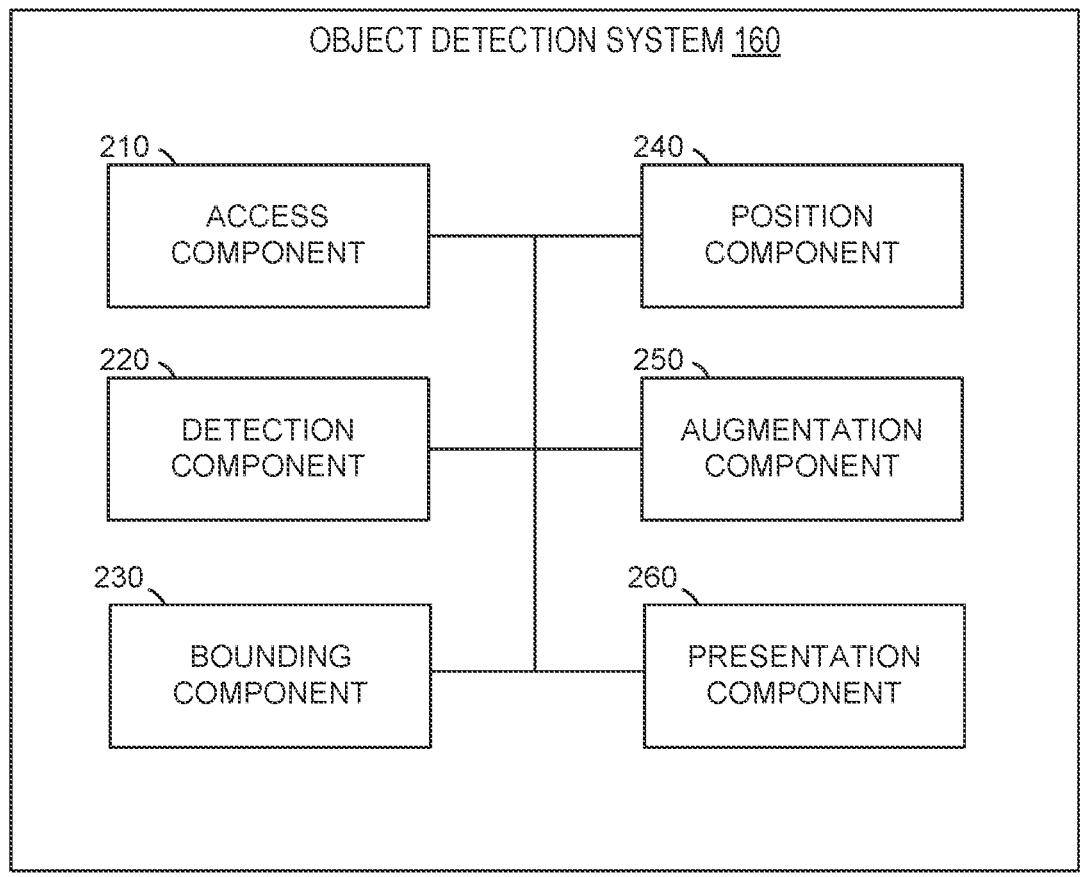
FIG. 2 is a diagram illustrating an object detection system, according to some example embodiments.

FIG. 2 is a diagram illustrating the object detection system 160. In FIG. 2, in various embodiments, the object detection system 160 can be implemented as a standalone system or implemented in conjunction with the client device 110, and is not necessarily included in the social messaging system 130. The object detection system 160 is shown to include an access component 210, a detection component 220, a bounding component 230, a position component 240, an augmentation component 250, and a presentation component 260. All, or some, of the components 210-260 communicate with each other, for example, via a network coupling, shared memory, and the like. Each component of the components 210-260 can be implemented as a single component, combined with other components, or further subdivided into multiple components. Other components not pertinent to example embodiments can also be included, but are not shown.

Figure 3:
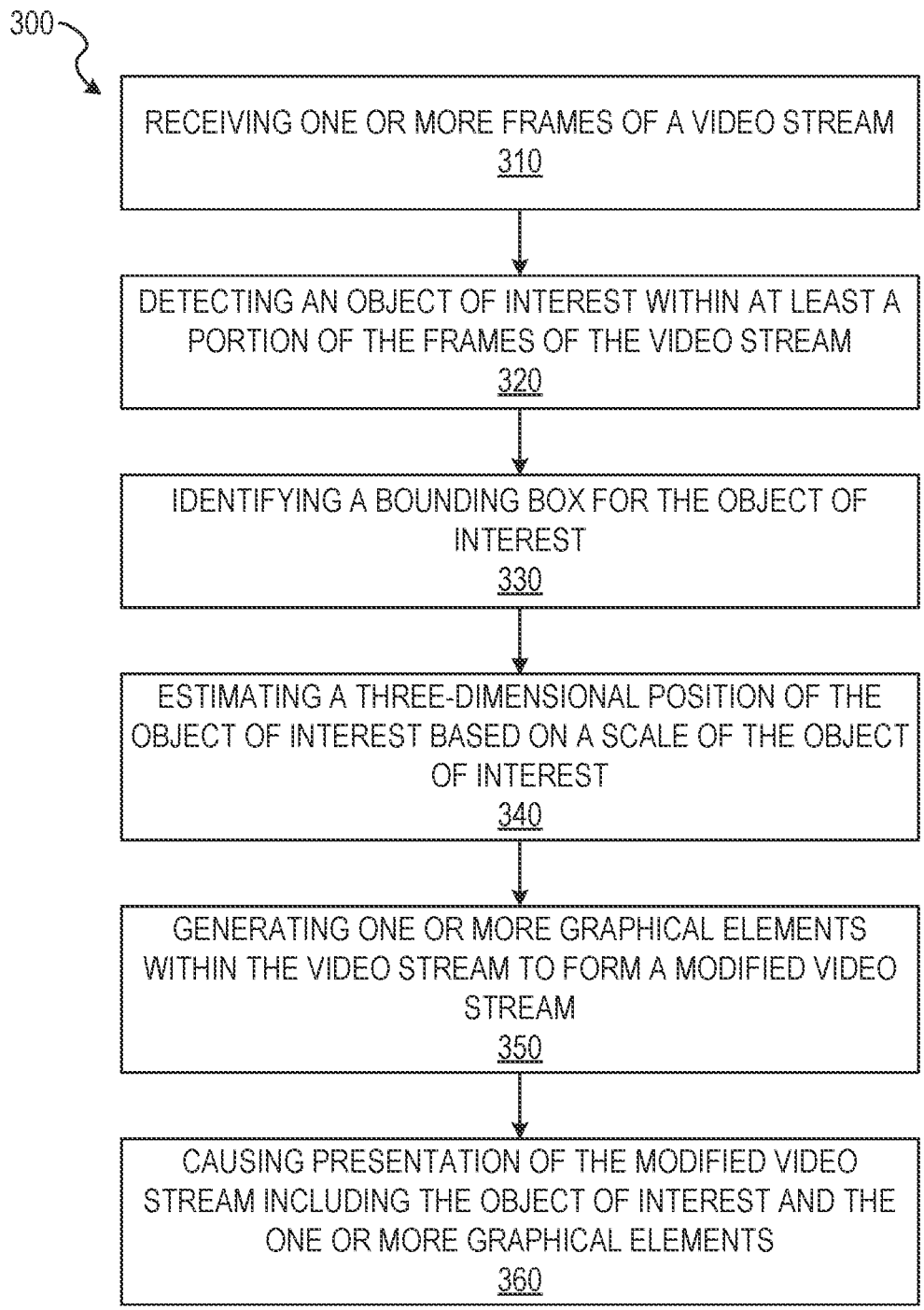
FIG. 3 is a flow diagram illustrating an example method for neural network-based object detection and image stream modification, according to some example embodiments.
Figure 4:
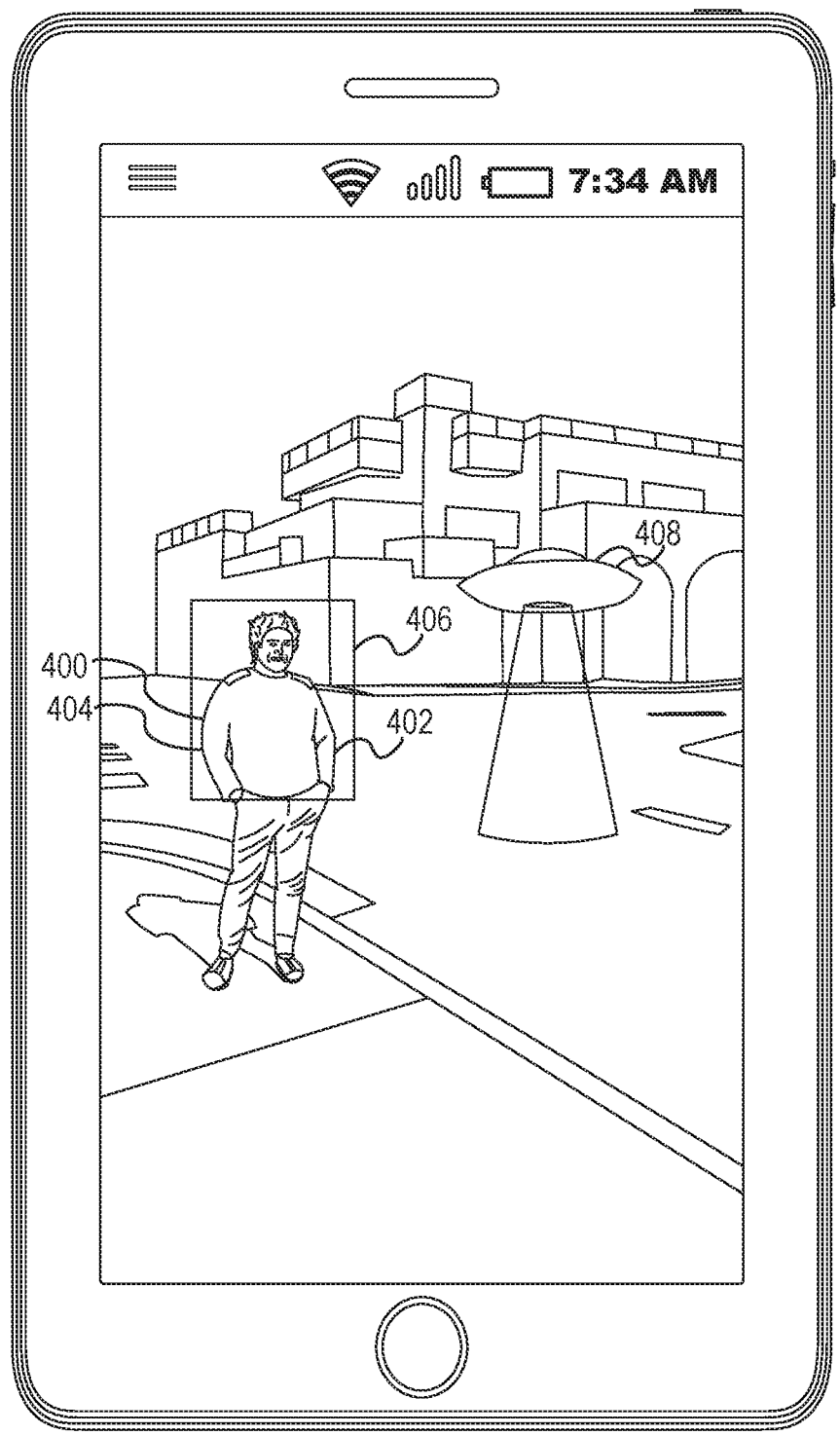
FIG. 4 is a user interface diagram depicting an object and a graphical element relative to the object, according to some example embodiments.

FIG. 3 depicts a flow diagram illustrating an example method 300 for neural network-based object detection and image stream modification. The operations of the method 300 may be performed by components of the object detection system 160, and are so described below for purposes of illustration.

In operation 310, the access component 210 receives or otherwise accesses one or more frames of a video stream or image stream. The one or more frames or one or more images may comprise a real-time preview or real-time capture of the video stream. In some embodiments, the one or more frames depict at least a portion of an object. In some embodiments, the access component 210 receives the one or more frames as a video stream captured by an image capture device associated with the client device 110 and presented on a user interface of an augmented-reality system. The access component 210 may include the image capture device as a portion of hardware comprising the access component 210. In these embodiments, the access component 210 directly receives the one or more images or the video stream captured by the image capture device. In some instances, the access component 210 passes all or a part of the one or more images or the video stream (e.g., a set of images comprising the video stream) to one or more other components of the object detection system 160, as described below in more detail.

In operation 320, the detection component 220 detects an object of interest within at least a portion of the frames of the video stream. In some embodiments, the detection component 220 detects the object of interest using a neural network model. In some instances, the object of interest is a person. The person may be positioned or oriented in any suitable position relative to the image capture device cooperating with the detection component 220. For example, the person may be squarely positioned, facing the image capture device. The person may also be oriented in a silhouette, in a side-facing orientation, facing away from the image capture device, or at any other angle between the above-referenced positions (e.g., thirty, forty-five, fifty, sixty, or ninety degrees from a facing orientation).

The person may be depicted within at least a portion of the video stream or at least occasionally within the video stream. The person, as the object of interest, may be depicted in whole or in part within the video stream. In some embodiments, the detection component 220 detects the person, as the object of interest, where a portion of the person's body is shown in frames of the video stream. As shown in FIGS. 4-8, a portion 402 of a person's body 400 in the frames may be the entirety of a person 404. However, the portion 402 of the person's body 400 may be a smaller portion, such as a head and shoulders, a head and torso, or any other combination of parts of the body 400. In some instances, the object of interest is detected as all or a portion of the torso of the body 400.

Although operation 320 is described with respect to a person and a body, the detection component 220 may detect other types, classes, or examples of objects of interest. In some instances, the detection component 220 is configured to detect a plurality of objects of interest or a plurality of categories of objects of interest. For example, the detection component 220 may detect multiple objects of interest in a video stream or in a frame of the video stream. The detection component 220 may also detect differing types or categories of objects of interest within the video stream or frame of the video stream. For example, the detection component 220 may be configured to detect a person, a car, a truck, a ball, a tree, a building, a sign, a text string, a stage, or any other suitable type or class of objects. In some instances, the detection component 220 is configured to detect multiple objects of interest of multiple differing types or classes within the same video stream or frame of a video stream.

In some embodiments, the detection component 220 operates in real time or near-real time on client devices or mobile computing devices having limited processing power or capacity and limited memory. The detection component 220 uses a comparatively smaller amount of memory and data storage, than previous systems, while providing robust detection performance despite interference or divergence factors such as object deformation (e.g., degrees of human body deformation, irregularities, or distortions), light changes, scale changes, background clutter, and occlusion or partial occlusion.

In some instances, the detection component 220 uses a single shot detector (SSD) framework for object detection and an associated training methodology. The SSD may use input images and ground-truth boxes for each object during training. The SSD may operate in a convolutional fashion, evaluating bounding boxes during training with different aspect ratios at a plurality of locations in a plurality of feature maps using different scales. Each bounding box, during training, may predict shape offsets and confidences for object categories being trained. During training, the bounding boxes may be matched to ground-truth boxes, and a model loss may be a weighted sum between localization loss and confidence loss. The SSD model may use a feed-forward convolutional network to produce a fixed-size collection of bounding boxes and scores for the presence of object class instances in the boxes, followed by a non-maximum suppression operation to produce a final detection. Early network layers may be based on a standard architecture used for high-quality image classification (truncated before any classification layers), which may be referred to as a base network. An auxiliary structure to the neural network may be added to produce detections having features relating to multi-scale feature maps for detection, convolutional predictors for detection, and default boxes and aspect ratios.

With respect to multi-scale feature maps, the SSD model may incorporate convolutional feature layers to the end of the truncated base network. These layers decrease in size progressively and allow predictions of detections at multiple scales. The convolutional model for predicting detections may be different for each feature layer.

With respect to convolutional predictors for detection, the SSD model may add one or more feature layers (or optionally an existing feature layer from the base network) to produce a fixed set of detection predictions using a set of convolutional filters. These may be indicated on top of the SSD network architecture. For a feature layer of size m×n with p channels, the basic element for predicting parameters of a potential detection is a 3×3×p small kernel that produces either a score for a category, or a shape offset relative to the default box coordinates. At each of the m×n locations where the kernel is applied, the SSD model may produce an output value. The bounding box offset output values may be measured relative to a default box position relative to each feature map location.

With respect to default boxes and aspect ratios, the SSD model may associate a set of default bounding boxes with each feature map cell, for multiple feature maps at the top of the network. The default boxes may tile the feature map in a convolutional manner, so that the position of each box relative to its corresponding cell is fixed. At each feature map cell, the SSD model may predict the offsets relative to the default box shapes in the cell, as well as the per-class scores that indicate the presence of a class instance in each of those boxes. Specifically, for each box out of k at a given location, the SSD model may compute c class scores and the 4 offsets relative to the original default box shape. This results in a total of (c+4)k filters that may be applied around each location in the feature map, yielding (c+4)kmn outputs for an m×n feature map. In some embodiments, default boxes are similar to the anchor boxes used in Faster R-CNN; however, the SSD model may apply them to several feature maps of different resolutions. Allowing different default box shapes in several feature maps enables the SSD model to efficiently discretize the space of possible output box shapes.

In some embodiments, in addition to the techniques described above, the detection component 220 incorporates soft non-maximum suppression (Soft-NMS) in object detection operations. In some instances, pruning operations in object detection may be performed using Soft-NMS as a re-scoring function, as described below.

$$S_i = \begin{cases} s_i, & iou(M, b_i) < N_t, \\ 0, & iou(M, b_i) \geq N_t \end{cases}$$

NMS may set a threshold while deciding what should be kept or removed from the neighborhood of M. The classification score of a box $b_i$ that has a high overlap with M may be decayed rather than suppressed using Soft-NMS. If $b_i$ contains an object not covered by M, a lower detection threshold may not miss. If $b_i$ does not cover any other object (while M covers an object), and even after decaying its score it ranks above true detections, it would still generate a false positive. Therefore, NMS may take certain conditions into account. The conditions may include a score of neighboring detections, removing neighboring detections, and an average precision. The neighboring detections may be decreased to an extent that they have a smaller likelihood of increasing the false positive rate, while being above obvious false positives in the ranked list of detections. Removing neighboring detections with a low NMS threshold may be suboptimal and increase the miss rate when evaluation is performed at high overlap thresholds. Average precision may be measured over a range of overlap thresholds which may drop when a high NMS threshold is used.

Functions may be rescored for Soft-NMS. Decaying the scores of other detection boxes which have an overlap with M may improve NMS. Scores for detection boxes which have a higher overlap with M may be decayed more, as they have a higher likelihood of being false positives. Given the above, in some embodiments a pruning step of object detection operations may be updated using the equation below.

$$s_i = \begin{cases} s_i, & iou(M, b_i) < N_t, \\ s_i(1 - iou(M, b_i)) & iou(M, b_i) \geq N_t \end{cases}$$

The above function may decay the scores of detections above a threshold $N_t$ as a linear function of overlap with M. In such instances, detection boxes which are far away from M would not be affected, and those which are very close would be assigned a greater penalty. The overlap may not be continuous. Where the overlap is not continuous, a sudden penalty may be applied when an NMS threshold of $N_t$ is reached. A continuous penalty function may be provided with no penalty when there is no overlap and a very high penalty at a high overlap. Also, when the overlap is low, the penalty function may increase the penalty gradually, as M may not affect the scores of boxes which have a very low overlap with it. When overlap of a box $b_i$ with M becomes close to one, $b_i$ may be penalized.

The pruning operations may be performed with a Gaussian penalty function as shown below.

$$s_i = s_i e^{-\frac{iou(M,b_i)^2}{\sigma}}, \forall b_i \notin \mathcal{D}$$

The Gaussian penalty function may be applied in each iteration and to score all remaining detection boxes. The Soft-NMS algorithm is formally described as $s_i \leftarrow s_i f(iou(M, b_i))$, where $f(iou(M, b_i))$ is an overlap-based weighting function. The computational complexity of each step in Soft-NMS may be O(N), where N is the number of detection boxes. This is because scores for all detection boxes which have an overlap with M are updated. For N detection boxes, the computational complexity for Soft-NMS may be O(N2). Such complexity may be the same as or similar to that of a traditional greedy-NMS. In some instances, NMS may be applied on some of the detection boxes and not others, such as boxes with a minimum threshold which are pruned in each iteration. The pruning operations may not be computationally expensive and may not affect the running time of object detection operations. In some instances, Soft-NMS is also a greedy algorithm and may not find the globally optimal re-scoring of detection boxes. In such instances, re-scoring of detection boxes may be performed in a greedy fashion, and hence detections which have a high local score may not be suppressed. Soft-NMS may be a generalized version of non-maximum suppression, and traditional NMS may be a special case of it with a discontinuous binary weighting function. Apart from the two proposed functions, other functions with more parameters can also be explored with Soft-NMS which take overlap and detection scores into account. For example, instances of the generalized logistic function such as the Gompertz function can be used.

In some embodiments where the detection component 220 is applied as a person detector on mobile computing devices, an aspect ratio of training images may be fixed in training the neural network model. By fixing aspect ratios of the training images, the model may be reduced in complexity and increased in computational and memory efficiency. Further, the fixed-aspect ratio neural network model may focus on more important or desirable aspects of the training data, such as scale variations or body deformations. In some instances, the detection component 220, detecting objects of interest, and the position component 240, tracking the object of interest as described in more detail below, may be run continuously in separate threads. The threads may be partitioned between differing cores of a processor, different processors, or a combination thereof. In some instances, the detection component 220 may operate slower than the position component 240. When new detection results arrive or are processed by the detection component 220, the position component 240 may merge the new detection results with existing targets being tracked, such as previously identified and tracked objects of interest. The merging operation may be based on a data association algorithm based on overlaps of bounding boxes for two or more of the objects of interest which have been detected.

In operation 330, the bounding component 230 identifies a bounding box for the object of interest. In some embodiments, the bounding box encompasses at least a portion of the object of interest. The bounding box may be identified and configured based on the object of interest, such that the bounding box is sized and proportioned to encompass at least a portion of the object of interest. In some instances, the bounding box is positioned such that a center of the bounding box is positioned at a center or approximate center of the object of interest. The bounding box may also be positioned around the object of interest based on the edges or corners of the bounding box and edges identified for the object of interest.

The bounding box may be configured to encompass a percentage or a threshold amount of the object of interest. For example, where the object of interest is a person as shown in FIGS. 4-8, a bounding box 406 may be configured to encompass a torso of the person 404 and be positioned such that the bounding box 406 encompasses the torso of the person 404 as the person 404 is depicted within the video stream. In some instances, the bounding component 230 moves the bounding box 406 based on or in response to movement of the object of interest (e.g., the person 404) to ensure that the portion 402 of the object of interest is encompassed by the bounding box 406.

Figure 5:
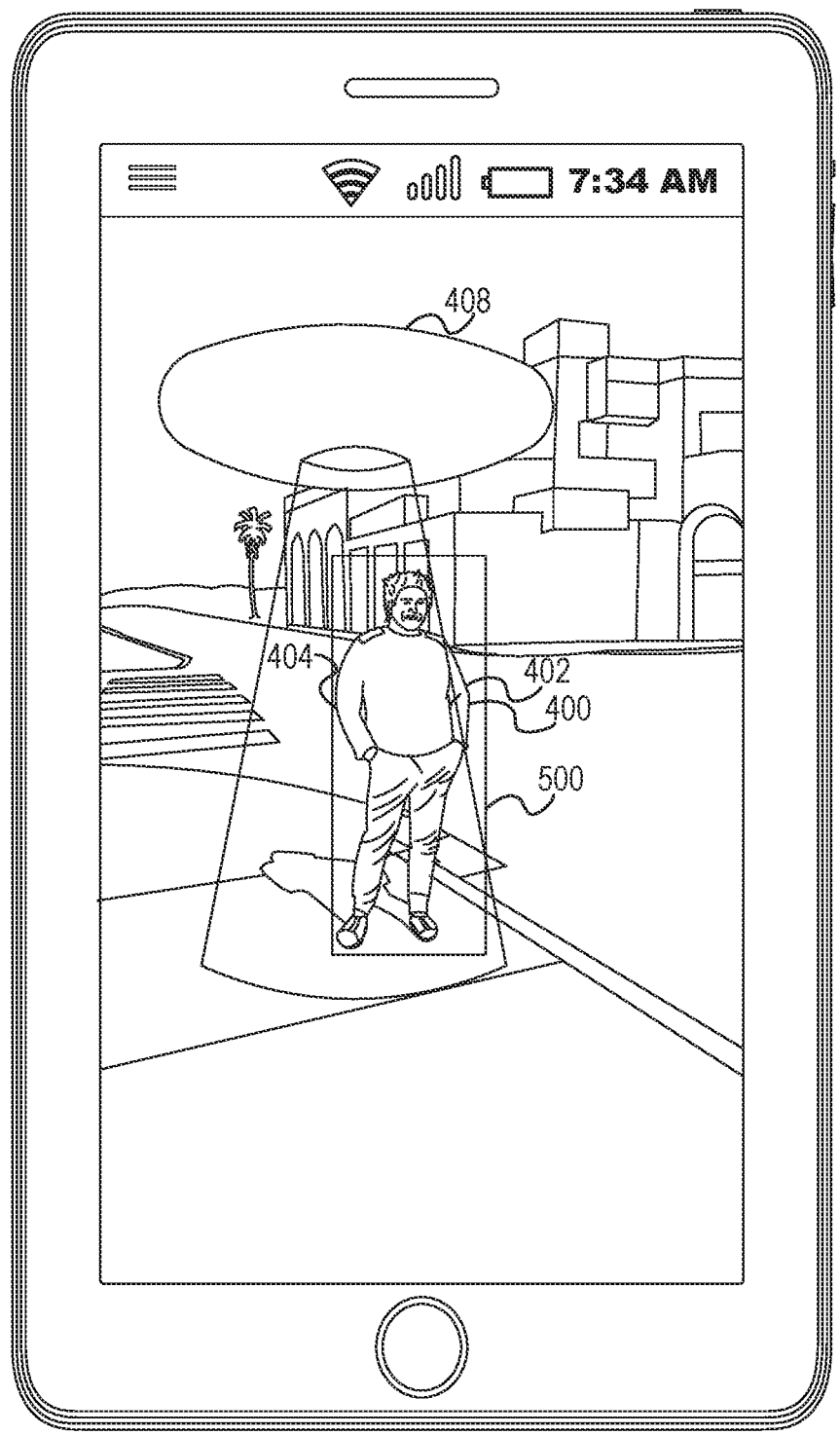
FIG. 5 is a user interface diagram depicting an object and a graphical element relative to the object, according to some example embodiments.
Figure 6:
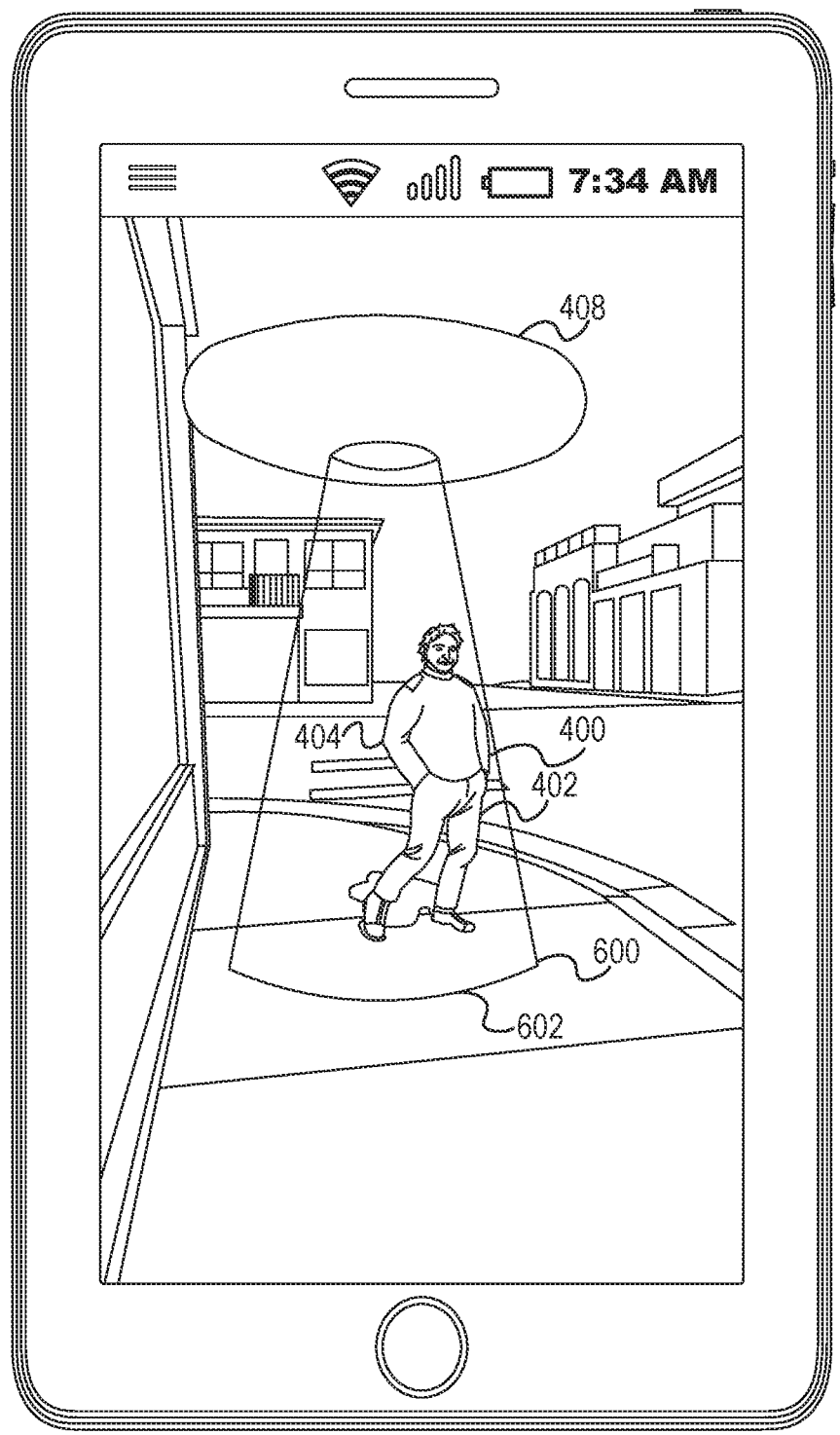
FIG. 6 is a user interface diagram depicting an object and a graphical element relative to the object, according to some example embodiments.
Figure 7:
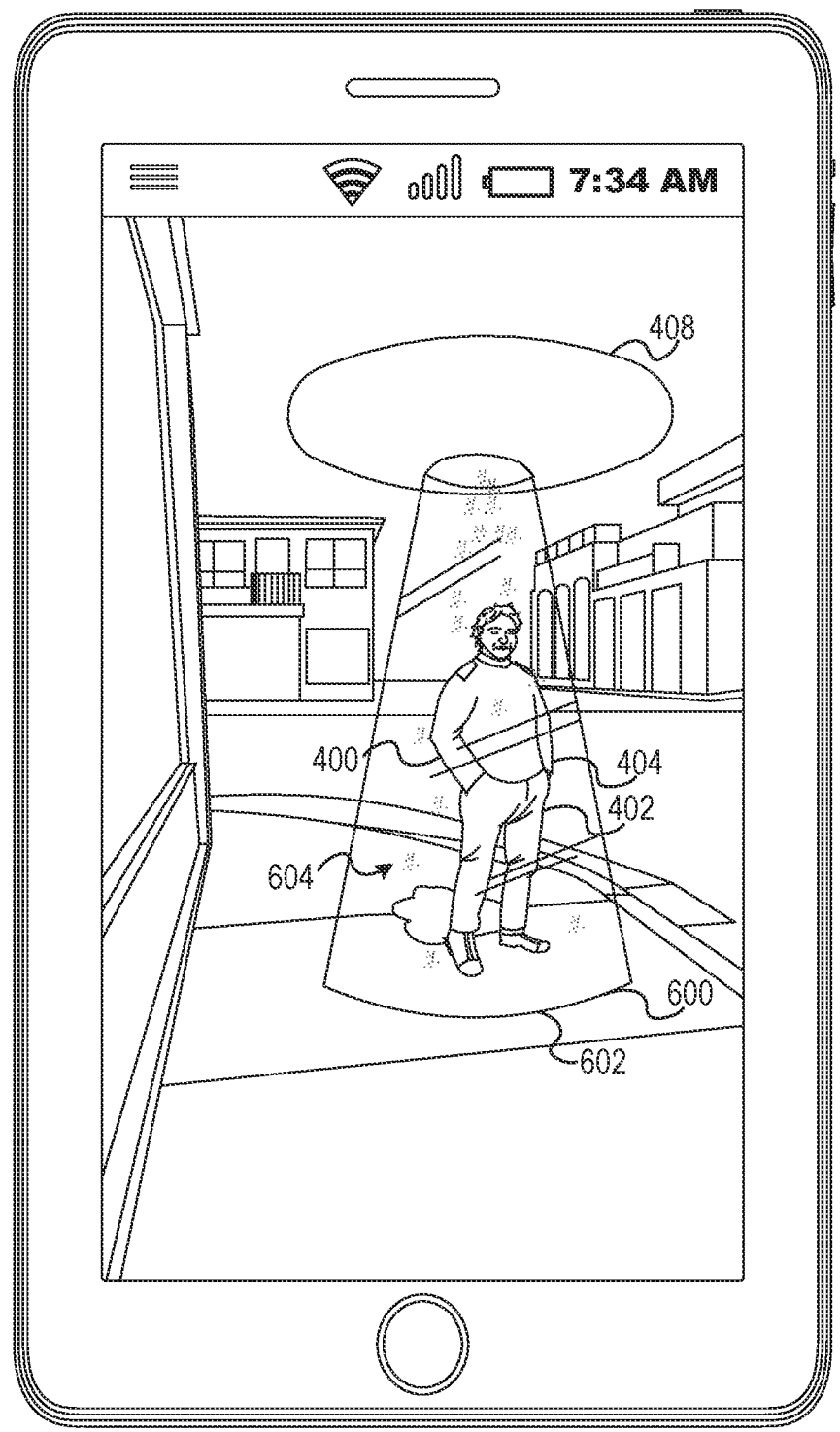
FIG. 7 is a user interface diagram depicting an object and a graphical element relative to the object, according to some example embodiments.
Figure 8:
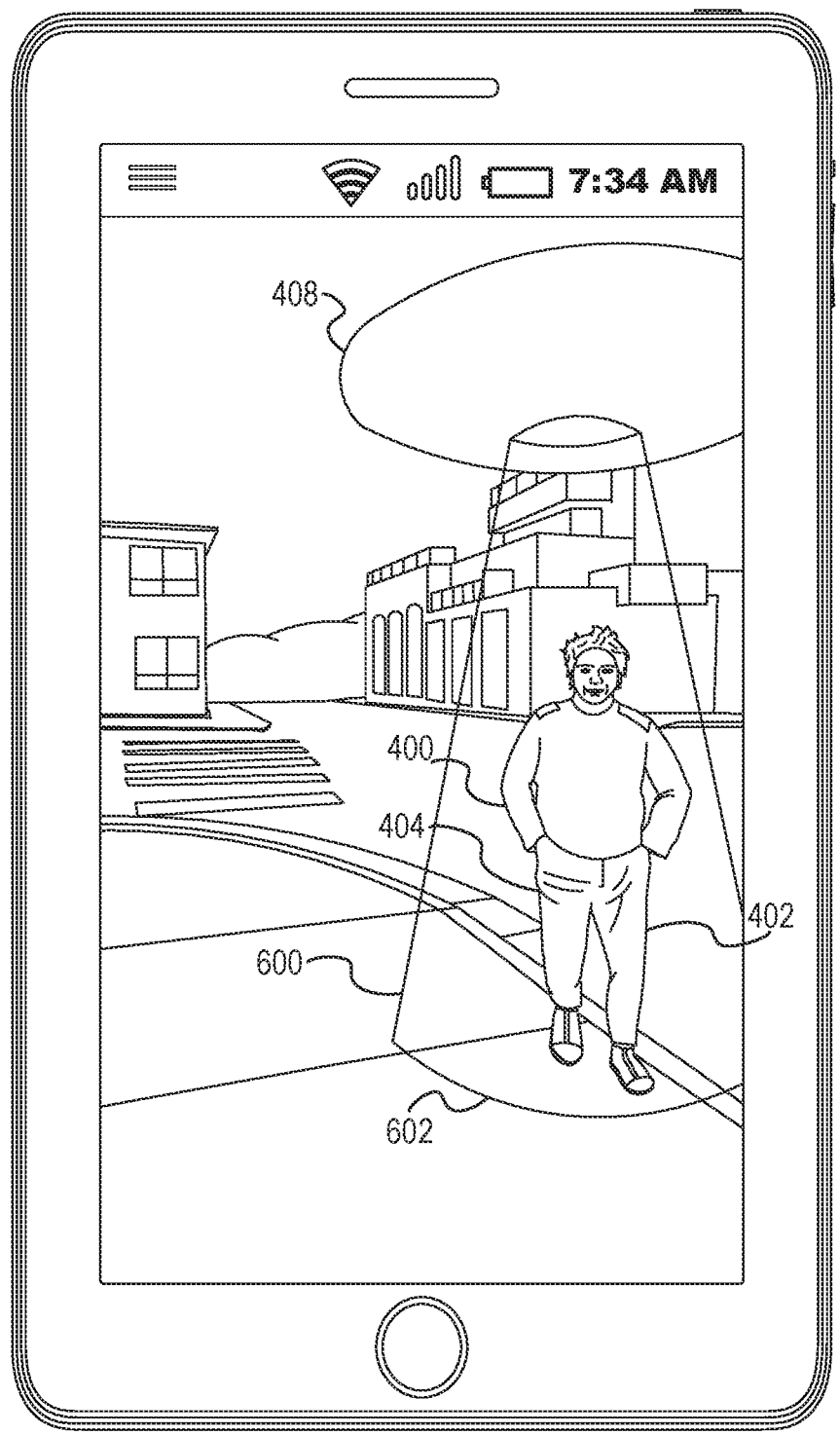
FIG. 8 is a user interface diagram depicting an object and a graphical element relative to the object, according to some example embodiments.

In some embodiments, the bounding component 230 identifies the bounding box 406 using one or more operations or sub-operations. In some instances, the bounding component 230 determines an object type for the object of interest and selects a bounding box type associated with the neural network model. The bounding box 406 may also correspond to the object type of the object of interest. The bounding component 230 may then define the bounding box 406 for the object of interest corresponding to the bounding box type and generate the bounding box 406 to encompass the object of interest, or a portion thereof. For example, as shown in FIG. 5, a bounding box 500 may be generated to encompass the entirety of the object of interest (e.g., the person 404). In some embodiments, the bounding box may be shown as a visual effect. For example, as shown in FIGS. 6-8, a bounding box 600 may be shown as a graphical element 602 or effect presented within the video stream. The graphical element 602 may be selected from a set of bounding box representations corresponding to a theme, a selected mode, an effect, a filter, or other suitable graphical elements configured to represent a bounding box within an augmented-reality presentation. The graphical element 602 may be presented in or after operation 350, described in more detail below. The graphical element 602 may incorporate themed effects 604, such as a shimmer, a wave, a color, or any other effect associated with the theme or selected mode and capable of integration with and obfuscation of at least a portion of the graphical element 602 or a purpose of the graphical element 602 as a bounding box.

In operation 340, the position component 240 estimates a three-dimensional position of the object of interest based on a scale of the object of interest. In some embodiments, upon detecting the object of interest and estimating the three-dimensional position, the position component 240 tracks the object of interest as the object of interest moves within the video stream or between two or more frames of the video stream. The position component 240 may be provided a center position for the bounding box and a scale for the object of interest to estimate the three-dimensional position. In response to the detection component 220 detecting the object of interest, a layer may be attached at a defined distance from one or more of a user, the image capture device capturing the video stream, or the object of interest depicted within the video stream. The layer may be independent of the orientation of the image capture device and may remain at a fixed distance or position relative to the image capture device. The position of the layer may then be modified based on the center position. One or more of a size or dimension of the layer may be manipulated based on one or more of a width and a height of the bounding box as the object of interest moves within the video stream.

In some instances, as the object of interest is tracked within the video stream, the object of interest may be temporarily lost or removed from the video stream. When object detection is lost, the layer may be transferred from an orientation relative to the image capture device to an orientation relative to the world depicted within the field of view of the image capture device. In such embodiments, the layer or a graphical element generated for insertion into the video stream may be positioned relative to the world or a portion thereof. Where the graphical element is associated with the layer positioned relative to the world or a portion thereof, the graphical element may be animated or otherwise rendered within the field of view of the image capture device and in the video stream to cause an illusion that the graphical element is persistent in the world or field of view.

In some embodiments, information relating to the object of interest, while the object of interest is tracked within the field of view of the image capture device, may be passed into one or more surface detection operations. The surface detection operations place the origin on the surface when the object is detected. A first graphical element generated within the video stream may be positioned proximate to the object of interest while one or more second graphical elements are rendered or animated within the field of view of the image capture device and interacting with the first graphical element. For example, a pizza (i.e., the first graphical element) may be animated in a hand of a person (e.g., the object of interest), and birds (i.e., the one or more second graphical elements) may be animated to converge on and devour the pizza.

In some instances, in detecting the object of interest, the detection component 220 determines a type or class of object for the object of interest. The class or type of object of interest may be associated with predetermined dimensions or a dimension range. The dimension or dimension range for the object of interest or the class of object may correspond to a scale or be used to generate a scale, providing a frame of reference for modifications performed to the video stream. The scale may be used to generate graphical elements, augmented-reality objects, effects, or any other suitable modification to the video stream. In some embodiments, generating graphical elements using the scale, dimensions, or dimension range of the object of interest enables the object detection system 160 to generate the graphical elements with one or more of a size, a shape, and dimensions relative to the object of interest. Further, the scale, dimensions, or dimension range of the object of interest may be used to ensure that the graphical elements generated by the object detection system 160 are of appropriate dimensions, as depicted within the video stream. For example, as shown in FIGS. 4-8, the scale may be used to ensure that an unidentified flying object (UFO) 408 is suitably larger than the person 404, the person 404 being the object of interest. By way of further example, the dimension for the person 404 (i.e., the object of interest) may be estimated or set as an average human height. The UFO 408 may then be rendered using a scale that causes the dimensions of the UFO 408 to be around twice the dimensions of the person 404.

In some embodiments, in tracking an object of interest, the position component 240 may consider subsequent frames and reduce a risk of drifting toward regions which exhibit similar appearance at a future time step. In some instances, in considering subsequent frames, the position component 240 may distinguish an object from its current surrounding background. In reducing risk of drifting, the position component 240 may identify distracting regions and suppress the regions to enable robust tracking. In some instances, the position component 240 operates as a distractor-aware object model, provides localization, and performs scale estimation.

In acting as a distractor-aware object model, the position component 240 distinguishes the object pixels from surrounding background pixels using a histogram-based Bayes classifier on the input image. The position component 240 may obtain an object likelihood at a given location. The likelihood terms may be estimated directly from color histograms and approximate the probabilities as shown below.

$$P(x \in \partial | O) \approx \frac{|O|}{(|O|+|S|)}$$

The position component 240 thus enables distinction between an object and background pixels. The position component 240 may address drift to nearby regions exhibiting a similar appearance to the object of interest by extending the object model to suppress such distracting regions. Based on the object likelihood scores computed over a large search region, the position component 240 may allow the SSD model to identify potentially distracting regions in advance and handle them accordingly. As such, the position component 240 may combine an object-background model with the distractor-aware representation using a weighting parameter. The combined model may yield high likelihood scores for discriminative object pixels while simultaneously decreasing the impact of distracting regions. To adapt the representation to changing object appearance and illumination conditions, the position component 240 may update the object model on a regular basis using linear interpolation with a given learning rate.

With respect to localization, the position component 240 may use a tracking-by-detection principle to localize the object of interest within a new frame at a given time. The position component 240 may extract a rectangular search region proportional to the previous object localization and obtain a new target location. In some embodiments, the position component 240 incorporates a Euclidean distance to a previous object center to generate a distance score for localizing the object. The distance term or distance score may penalize large inter-frame movements, similar to a Gaussian and cosine windowing operation. The position component 240 may densely sample overlapping candidate hypotheses within a search region and compute both a vote and distance score for each candidate. The position component 240 may enable an efficient determination of a new object location as well as visually similar distractors. The regions may yield a high vote score. To prevent selecting ambiguous distractors, the position component 240 may use an iterative non-maximum suppression strategy. For example, after a candidate object or distractor is selected, overlapping hypotheses may be discarded. After obtaining both the new object location and the set of distractors, the object model may be updated to suppress the background and identified distracting regions to reduce the risk of drifting at a later time.

With respect to scale estimation, the position component 240 may localize the object in a new frame and subsequently perform scale estimation. In some embodiments, the position component 240 uses the above-described object model to segment the object of interest for scale adaptation via thresholding. In some embodiments, a predefined threshold is used. In some instances, an adaptive threshold is used. The position component 240 may determine an object likelihood map by evaluating the combined object model at locations of the search region. The position component 240 may then determine cumulative histograms over an object region and a surrounding region. The position component 240 then uses the cumulative histograms to compute the adaptive segmentation threshold.

As described, in some embodiments, the position component 240 penalizes thresholds within flat regions of the cumulative object histogram, such as thresholds within a specified range. The obtained threshold may reduce background noise while yielding a sufficiently large number of object pixels. To adapt the scale of the current object hypothesis, the position component 240 may define a safe foreground region and perform a connected component analysis based on the segmentation result after applying the adaptive threshold. Connected components which yield a high average object likelihood score and intersect the safe foreground region may be labeled as object regions. Computing the enclosing bounding box over these regions then gives the scale estimate for a current frame. If the estimated scale change between the current and previous frames is above a reasonable percentage, the position component 240 discards the segmentation as unreliable. Otherwise, the position component 240 uses it to update the dimension of the object hypothesis.

In operation 350, the augmentation component 250 generates one or more graphical elements within the video stream to form a modified video stream. For example, as shown in FIGS. 4-8, the one or more graphical elements are the UFO 408 and a beam emanating from the UFO 408 and encompassing the person 404. In some embodiments, the augmentation component 250 generates the one or more graphical elements with a defined size and a defined position. In some instances, the one or more graphical elements have a size based on the scale of the object of interest. As described above, in some embodiments, the augmentation component 250 generates the one or more graphical elements with dimensions having a persistent scale relative to the object of interest. Although the one or more graphical elements are shown as a UFO 408, it should be understood that the one or more graphical elements may be any suitable graphical elements, such as a shaft of light, stickers, flying birds, butterflies, a rain cloud, a shadow, a car, a suit of armor, or any other suitable graphical element or plurality of graphical elements.

In some instances, the scale may not be persistent with respect to the object of interest. In some instances, the graphical element may be a fixed-scale image animated or rendered to fill the bounding box. For example, a small image of a fire may be generated as a plurality of images of fire until the plurality of images fill the bounding box. The plurality of graphical elements may be shaped accurately with respect to the bounding box. For example, the fire may be animated or rendered to engulf the object of interest, or the portion of the object of interest located within the bounding box.

In some instances, the graphical elements may be generated relative to the object of interest, such that the graphical elements are at least partially occluded by the object of interest. For example, the graphical elements may be animated or rendered as a background behind the object of interest or a character peeking out from behind the object of interest. Further, in some embodiments, the graphical elements may be animated or rendered to modify a scene or field of view of the image capture device within the video stream. For example, the graphical elements may be rendered as a shaft of light overlaid on the object of interest, and other graphical elements may be rendered as shadows relative to one or more of the object of interest and the shaft of light. In such example instances, the modification of the scene may cause the field of view within the video stream to appear to be lit from an artificial position different from that of an actual lighting source. Further, the graphical elements may manipulate or modify portions of the object of interest (e.g., making a person appear larger, smaller, fatter, or skinnier than an unmodified depiction of the object of interest).

The one or more graphical elements may have a position based on the three-dimensional position estimated for the object of interest. In some embodiments, the one or more graphical elements are generated with a persistent position relative to the object of interest. In such embodiments, the position component 240 may track the object of interest between positions within the video stream. For example, the object of interest may move between a first position and a second position. The position component 240 may track the object of interest within the modified video stream to identify a position change of the object of interest reflecting movement from the first position to the second position. The augmentation component 250 may generate a modified position of the one or more graphical elements in response to the position change of the object of interest. The modified position may correspond to the second position of the object of interest. The modified position may also be a persistent distance or a persistent relative distance from the object of interest, similar to a distance between the object of interest and the one or more graphical elements when the object of interest is in the first position.

In tracking the object of interest, the position component 240 enables real-time or near real-time rendering and presentation of graphical elements relative to the object of interest.

In some embodiments, the augmentation component 250 generates the one or more graphical elements with a size corresponding to one or more of the size and the position of the object of interest. In some instances, the object of interest may have a first size at the first position and a second size at the second position, described above. The position component 240 may track the object of interest within the modified video stream to identify a size change of the object of interest as depicted within the modified video stream. The size change may correspond to the position change. The augmentation component 250 may generate a modified size for the one or more graphical elements in response to the size change of the object of interest. In some instances, the modified size corresponds to the second size of the object of interest at the second position. Where the one or more graphical elements are generated using a scale relative to the object of interest, the augmentation component 250 may maintain the scale in generating the graphical elements at the modified size.

In operation 360, the presentation component 260 causes presentation of the modified video stream including the object of interest and the one or more graphical elements.

In some embodiments, the neural network model used for detecting the object of interest within the video stream is a deep neural network structure. The neural network structure may include a varying number of layers (e.g., object functions). The number and type of layers (e.g., object functions) may vary based on the amount and type of information to be interpreted or otherwise identified for the object of interest (e.g., a face, a person, a logo, a car, etc.). In some embodiments, the layers include one or more convolution layers, one or more pooling layers, and one or more fully connected layers. Objective functions of the layers may be fitted in a cascade, with each fit objective function causing modification to parameters for one or more of the subsequent objective functions within the descriptor function. The model may be simultaneously fit such that determining a fit for each objective function produces a set of probabilities for a predetermined set of features or identifying characteristics as an output of the descriptor function. In some embodiments, each objective function may be fit by modifying one or more of the objective functions within the descriptor function by stochastic gradient descent updating. Such updating may be performed in a cooperative manner.

The neural network model may be trained on a plurality of objects depicted within images. The images used to train the neural network model may be single red-green-blue (RGB) images. The detection component 220 may train the neural network model to automatically or independently learn how to produce a bounding box on run-time or production images, frames, or video based on pixel data contained within the images. The plurality of training objects may be encompassed or partially encompassed within bounding boxes. For example, each object of the plurality of training objects may be depicted in a training image and at least partially encompassed by a bounding box. Each training image, with a corresponding training object, may be labeled with a class, category, or other descriptor or set of descriptors associated with the training object depicted within the training image. In some instances, the class, category, or descriptor may define the training object in a standard class, a predefined class, a proprietary class, or a dynamically determined class for organizing objects.

The detection component 220 or a modeling component may train the neural network with a set of training images comprising a plurality of categories or classes, such that the neural network is simultaneously trained using a set, a plurality, or all of the classes or categories representing potential objects of interest to be detected by the object detection system 160. For example, a class of objects of interest may be hands, people, hats, cars, plants, or any other suitable object classes.

In some embodiments using the SSD model, the detection component 220 may train the SSD model using ground-truth information assigned to specific outputs in a fixed set of detector outputs. Some version of this may also be used in training a region proposal stage of neural network models. Once this assignment is determined, the loss function and back propagation may be applied end-to-end. Training may also involve choosing the set of default boxes and scales for detection as well as the hard negative mining and data augmentation strategies.

During training, the detection component 220 may determine which default boxes correspond to a ground-truth detection and train the network accordingly. For each ground-truth box, the detection component 220 may select from default boxes that vary over location, aspect ratio, and scale. The detection component 220 may begin by matching each ground-truth box to the default box with the best Jaccard overlap. The detection component 220 may then match default boxes to any ground truth with Jaccard overlap higher than a threshold, such as 0.5. This may simplify the learning problem, allowing the network to predict high scores for multiple overlapping default boxes rather than the neural network model picking only the one with maximum overlap.

The detection component 220 may train the SSD model according to an objective derived from a Multibox objective, and the model may be extended to handle multiple object categories. In some embodiments, the detection component 220 uses an indicator for matching an ith default box to a jth ground-truth box of category p. In such instances, the indicator may be represented as $x_{ij}^p = \{1, 0\}$. In the previously described matching operations, the indicator may be represented as shown below.

$$\Sigma_i x_{ij}^p \geq 1$$

In such instances, an overall objective loss function may be a weighted sum of the localization loss (loc) and the confidence loss (conf), as represented below.

$$L(x, c, l, g) = \frac{1}{N}(L_{conf}(x, c) + \alpha L_{loc}(x, l, g))$$

In the above representation, N is a number of matched default boxes. If N=0, the loss may be set to 0. The localization loss may be a Smooth L1 loss between predicted box (l) and ground-truth box (g) parameters. The detection component 220 may regress to offsets for a center (cx, cy) of the default bounding box (d) and for its width (w) and height (h). In some embodiments, the regression may be represented as shown below.

$$L_{loc}(x, l, g) = \sum_{i \in Pos}^{N} \sum_{m \in \{cx,cy,w,h\}} x_{ij}^k smooth_{L1}\left(l_i^m - \hat{g}_j^m\right)$$

$$\hat{g}_j^{cx} = \frac{\left(g_j^{cx} - d_j^{cx}\right)}{d_i^w}$$

$$\hat{g}_j^{cy} = \frac{\left(g_j^{cy} - d_j^{cy}\right)}{d_i^h}$$

$$\hat{g}_j^w = \log\left(\frac{g_j^w}{d_j^w}\right)$$

$$\hat{g}_j^h = \log\left(\frac{g_j^h}{d_j^h}\right)$$

In some instances, the confidence loss is a softmax loss over multiple class confidences (c). In the representation below, a weight term $\alpha$ may be set to 1 by cross validation.

$$L_{conf}(x, c) = -\sum_{i \in Pos}^{N} x_{ij}^p \log(\hat{c}_i^p) - \sum_{i \in Neg} \log(\hat{c}_i^0)$$

$$\text{where } \hat{c}_i^p = \frac{\exp(c_i^p)}{\sum_p \exp(c_i^p)}$$

In some embodiments, the detection component 220 chooses scales to accommodate aspect ratios for default boxes. By utilizing feature maps from several different layers in a single network for prediction, the detection component 220 mimics an effect of processing a training image at different sizes and combining results, while also sharing parameters across all object scales. The detection component 220 may use both the lower and upper feature maps for detection.

Feature maps from different levels within a network may have different (empirical) receptive field sizes. Within the SSD framework, the default boxes may not correspond to the actual receptive fields of each layer. The detection component 220 may tile the default boxes so that specific feature maps learn to be responsive to particular scales of the objects. For example, if m feature maps for prediction are used, the scale of the default boxes for each map may be computed as represented below, where $s_{min}$ is 0.2 and $s_{max}$ is 0.9. In such instances, the lowest layer has a scale of 0.2 and the highest layer has a scale of 0.9, and all layers in between may be regularly spaced.

$$s_k = s_{min} + \frac{s_{max} - s_{min}}{m-1}(k-1), k \in [1, m]$$

By combining predictions for all default boxes with different scales and aspect ratios from all locations of many feature maps, the SSD model may have a diverse set of predictions, covering various input object sizes and shapes. In some embodiments, after the matching step, most of the default boxes may be negatives, especially when the number of possible default boxes is large. This may introduce a significant imbalance between the positive and negative training examples. Instead of using all the negative examples, the detection component 220 may sort them using the highest confidence loss for each default box and pick the top ones so that the ratio between the negatives and positives is at most 3:1, or any other suitable ratio.

The detection component 220 may perform data augmentation to make the SSD model more robust to various input object sizes and shapes. In some embodiments, each training image may be randomly sampled by one or more options. In some instances, the detection component 220 uses the entire original input image. The detection component 220 may also sample a patch so that the minimum Jaccard overlap with the objects is 0.1, 0.3, 0.5, 0.7, or 0.9. The detection component 220 may also randomly sample a patch. The size of each sampled patch may be [0.1, 1] of the original image size, and the aspect ratio may be between 1 and 2. The detection component 220 may keep the overlapped part of the ground-truth box if the center of it is in the sampled patch. After the aforementioned sampling step, each sampled patch may be resized to a fixed size and horizontally flipped with probability of 0.5, and some photo-metric distortions may be applied.

Figure 9:
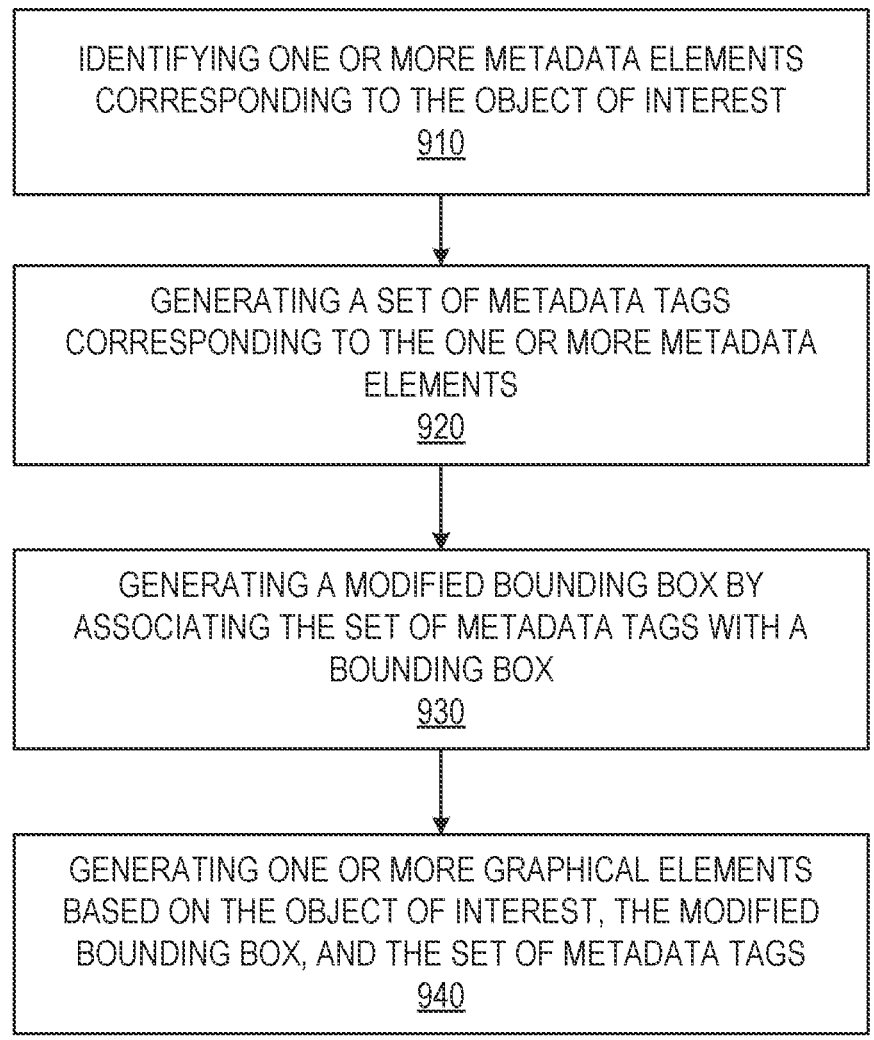
FIG. 9 is a flow diagram illustrating an example method for neural network-based object detection and image stream modification, according to some example embodiments.

FIG. 9 depicts a flow diagram illustrating an example method 900 for neural network-based object detection and image stream modification. The operations of the method 900 may be performed by components of the object detection system 160. In some instances, certain operations of the method 900 may be performed using one or more operations of the method 300 or as sub-operations of one or more operations of the method 300.

In operation 910, the detection component 220 identifies one or more metadata elements corresponding to the object of interest. The metadata elements may describe the object of interest. In some instances, the metadata elements describe a context for the object of interest. The description of the object of interest, an environment of the object of interest, a portion of the object of interest, or a context of the object of interest may represent types, categories, or classes of graphical elements or be related thereto. The graphical elements may be related to a metadata element or modify at least a portion of the object of interest described by the metadata element.

In some embodiments, the metadata elements correspond to an orientation, a position, a gesture, an emotion, a condition, a speed or velocity, a characteristic, a color, a context, combinations thereof, or any other suitable information describing an aspect of the object of interest or a situation or environment in which the object of interest is depicted. The one or more metadata elements may describe the object of interest or portions of the object of interest in relation to the image capture device, a plane, another object of interest, another portion of the object of interest, or any other movable or stationary object.

The orientation may be an orientation of a person, such as standing, lying down, facing away from the image capture device, facing toward the image capture device, leaning, squatting, silhouetted, combinations thereof, or any other suitable orientation relative to the image capture device. The position may be similar to orientation but may correspond to an orientation of the object of interest without relation to the image capture device. Position may also represent a position of the object of interest in a foreground, in a background, or relative to a plane (e.g., the ground), or any other position of the object of interest. In some instances, the position represents a position of a portion of the object of interest. For example, where the object of interest is a person, a position metadata element may correspond to a torso, a limb, a head, a hand, a foot, or any other portion of the person.

In operation 920, the detection component 220 generates a set of metadata tags corresponding to the one or more metadata elements identified for the object of interest. The metadata tags may be a token, value, string, or other representation of one or more metadata elements. In some embodiments, each metadata tag of the set of metadata tags represents a single element or representation identified for the object of interest. For example, where the context of the object of interest is a human, facing a righthand side of the frames in the video stream, and moving in the righthand direction, the set of metadata tags may include a metadata tag indicating that a human is in the frame, a metadata tag indicating motion of the human, a metadata tag indicating a direction of motion, a metadata tag indicating a direction the human is facing, and other suitable metadata tags. Although described with specific examples, it should be understood that the metadata tags may include any suitable representation of discernable objects, actions, characteristics, and graphical elements depicted within frames of the video stream.

In operation 930, the bounding component 230 generates a modified bounding box by associating the set of metadata tags with the bounding box. The bounding component 230 may associate the set of metadata tags with the bounding box by inserting the metadata tags into data representing the bounding box. The bounding component 230 may associate the set of metadata tags by generating a metadata file or metadata structure including the metadata tags. The bounding component 230 may then associate the file or metadata structure with the bounding box by generating a reference to the bounding box in the file, generating a reference to the file in the bounding box, or combinations thereof. Although operation 930 is described with reference to specific associations, the bounding component 230 may generate associations between the set of metadata tags and the bounding box in any suitable manner.

In operation 940, the augmentation component 250 generates the one or more graphical elements based on the object of interest, the modified bounding box, and the set of metadata tags. In some instances, the augmentation component 250 generates the one or more graphical elements with a size based on the scale of the object of interest, a position based on the three-dimensional position estimated for the object of interest, and an element context corresponding to at least one metadata tag of the set of metadata tags. The one or more graphical elements may be generated within the video stream to form a modified video stream.

Modules, Components, and Logic

Certain embodiments are described herein as including logic or a number of components, modules, or mechanisms. Components can constitute hardware components. A "hardware component" is a tangible unit capable of performing certain operations and can be configured or arranged in a certain physical manner. In various example embodiments, computer systems (e.g., a standalone computer system, a client computer system, or a server computer system) or hardware components of a computer system (e.g., at least one hardware processor, a processor, or a group of processors) are configured by software (e.g., an application or application portion) as a hardware component that operates to perform certain operations as described herein.

In some embodiments, a hardware component is implemented mechanically, electronically, or any suitable combination thereof. For example, a hardware component can include dedicated circuitry or logic that is permanently configured to perform certain operations. For example, a hardware component can be a special-purpose processor, such as a Field-Programmable Gate Array (FPGA) or an Application-Specific Integrated Circuit (ASIC). A hardware component may also include programmable logic or circuitry that is temporarily configured by software to perform certain operations. For example, a hardware component can include software encompassed within a general-purpose processor or other programmable processor. It will be appreciated that the decision to implement a hardware component mechanically, in dedicated and permanently configured circuitry, or in temporarily configured circuitry (e.g., configured by software) can be driven by cost and time considerations.

Accordingly, the phrase "hardware component" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software can accordingly configure a particular processor or processors, for example, to constitute a particular hardware component at one instance of time and to constitute a different hardware component at a different instance of time.

Hardware components can provide information to, and receive information from, other hardware components. Accordingly, the described hardware components can be regarded as being communicatively coupled. Where multiple hardware components exist contemporaneously, communications can be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component performs an operation and stores the output of that operation in a memory device to which it is communicatively coupled. A further hardware component can then, at a later time, access the memory device to retrieve and process the stored output. Hardware components can also initiate communications with input or output devices, and can operate on a resource (e.g., a collection of information).

The various operations of example methods described herein can be performed, at least partially, by processors that are temporarily configured (e.g., by software) or permanently configured to perform the relevant operations. Whether temporarily or permanently configured, such processors constitute processor-implemented components that operate to perform operations or functions described herein. As used herein, "processor-implemented component" refers to a hardware component implemented using processors.

Similarly, the methods described herein can be at least partially processor-implemented, with a particular processor or processors being an example of hardware. For example, at least some of the operations of a method can be performed by processors or processor-implemented components. Moreover, the processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via appropriate interfaces (e.g., an application programming interface (API)).

The performance of certain of the operations may be distributed among the processors, not only residing within a single machine, but deployed across a number of machines. In some example embodiments, the processors or processor-implemented components are located in a single geographic location (e.g., within a home environment, an office environment, or a server farm). In other example embodiments, the processors or processor-implemented components are distributed across a number of geographic locations.

Applications

Figure 10:
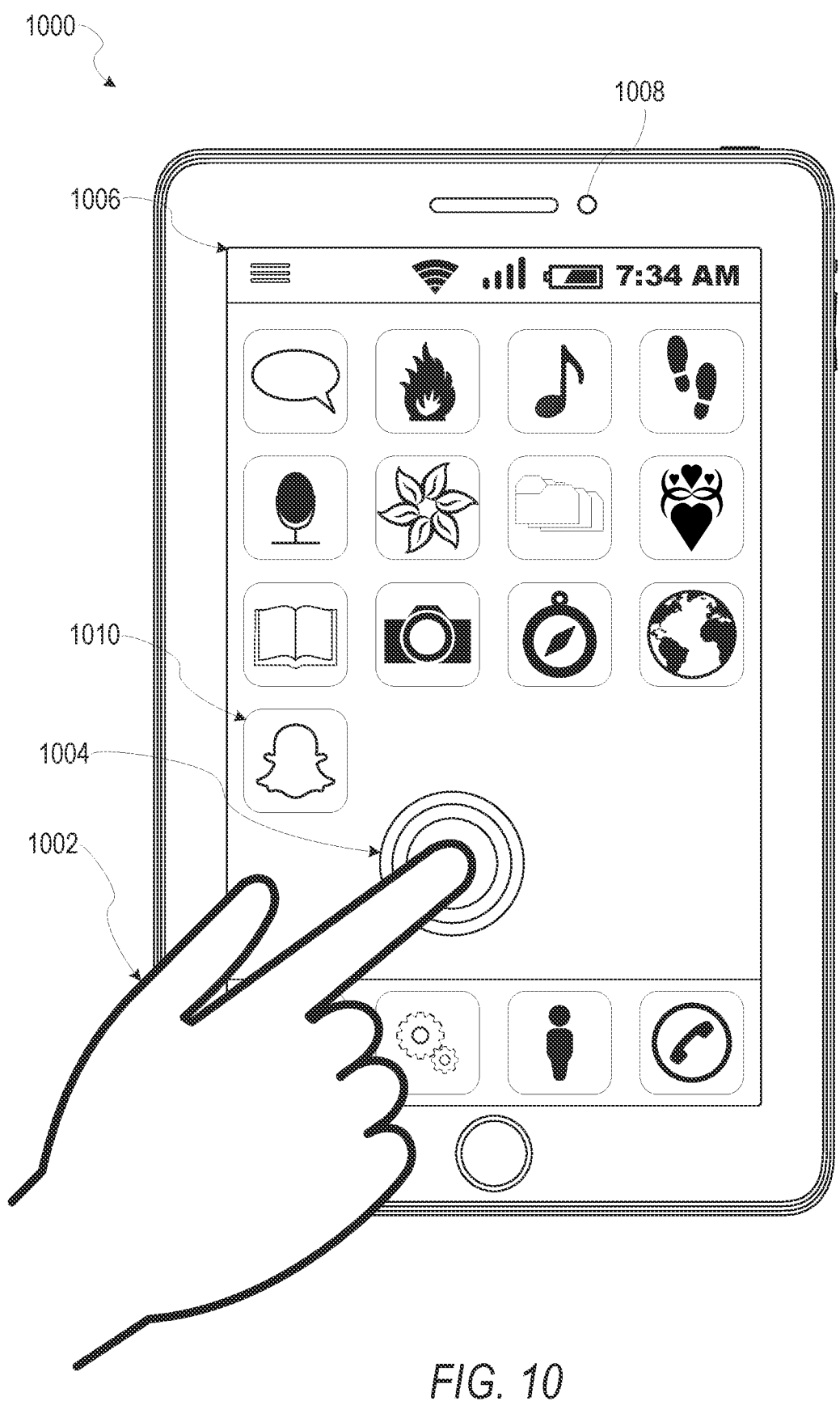
FIG. 10 is a user interface diagram depicting an example mobile device and mobile operating system interface, according to some example embodiments.

FIG. 10 illustrates an example mobile device 1000 executing a mobile operating system (e.g., IOS™, ANDROID™, WINDOWS® Phone, or other mobile operating systems), consistent with some embodiments. In one embodiment, the mobile device 1000 includes a touch screen operable to receive tactile data from a user 1002. For instance, the user 1002 may physically touch 1004 the mobile device 1000, and in response to the touch 1004, the mobile device 1000 may determine tactile data such as touch location, touch force, or gesture motion. In various example embodiments, the mobile device 1000 displays a home screen 1006 (e.g., Springboard on IOS™) operable to launch applications or otherwise manage various aspects of the mobile device 1000. In some example embodiments, the home screen 1006 provides status information such as battery life, connectivity, or other hardware statuses. The user 1002 can activate user interface elements by touching an area occupied by a respective user interface element. In this manner, the user 1002 interacts with the applications of the mobile device 1000. For example, touching the area occupied by a particular icon included in the home screen 1006 causes launching of an application corresponding to the particular icon.

The mobile device 1000, as shown in FIG. 10, includes an imaging device 1008. The imaging device 1008 may be a camera or any other device coupled to the mobile device 1000 capable of capturing a video stream or one or more successive images. The imaging device 1008 may be triggered by the object detection system 160 or a selectable user interface element to initiate capture of a video stream or succession of images and pass the video stream or succession of images to the object detection system 160 for processing according to the one or more methods described in the present disclosure.

Many varieties of applications (also referred to as "apps") can be executing on the mobile device 1000, such as native applications (e.g., applications programmed in Objective-C, Swift, or another suitable language running on IOS™ or applications programmed in Java running on ANDROID™), mobile web applications (e.g., applications written in Hypertext Markup Language-5 (HTML5)), or hybrid applications (e.g., a native shell application that launches an HTML5 session). For example, the mobile device 1000 includes a messaging app, an audio recording app, a camera app, a book reader app, a media app, a fitness app, a file management app, a location app, a browser app, a settings app, a contacts app, a telephone call app, or other apps (e.g., gaming apps, social networking apps, biometric monitoring apps). In another example, the mobile device 1000 includes a social messaging app 1010 such as SNAPCHAT® that, consistent with some embodiments, allows users to exchange ephemeral messages that include media content. In this example, the social messaging app 1010 can incorporate aspects of embodiments described herein. For example, in some embodiments, the social messaging app 1010 includes an ephemeral gallery of media created by users the social messaging app 1010. These galleries may consist of videos or pictures posted by a user and made viewable by contacts (e.g., "friends") of the user. Alternatively, public galleries may be created by administrators of the social messaging app 1010 consisting of media from any users of the application (and accessible by all users). In yet another embodiment, the social messaging app 1010 may include a "magazine" feature which consists of articles and other content generated by publishers on the social messaging app 1010's platform and accessible by any users. Any of these environments or platforms may be used to implement concepts of the present inventive subject matter.

In some embodiments, an ephemeral message system may include messages having ephemeral video clips or images which are deleted following a deletion trigger event such as a viewing time or viewing completion. In such embodiments, a device implementing the object detection system 160 may perform neural network-based object detection and image stream modification in real time or near-real time within the ephemeral message, and transmit the ephemeral message to another device using the ephemeral message system.

Software Architecture

Figure 11:
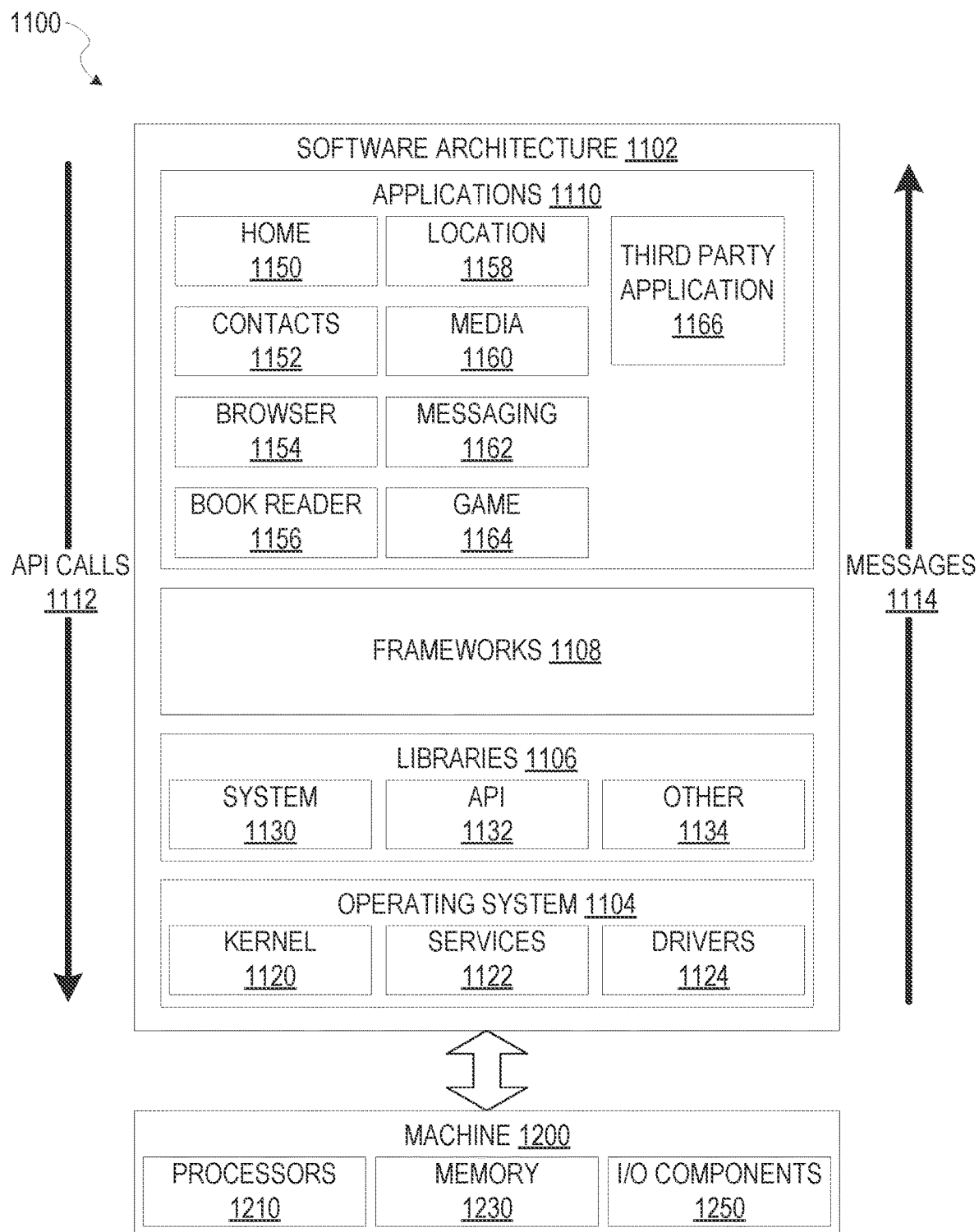
FIG. 11 is a block diagram illustrating an example of a software architecture that may be installed on a machine, according to some example embodiments.

FIG. 11 is a block diagram 1100 illustrating a software architecture 1102, which can be installed on the devices described above. FIG. 11 is merely a non-limiting example of a software architecture, and it will be appreciated that many other architectures can be implemented to facilitate the functionality described herein. In various embodiments, the software 1102 is implemented by hardware such as a machine 1200 of FIG. 12 that includes processors 1210, memory 1230, and I/O components 1250. In this example architecture, the software 1102 can be conceptualized as a stack of layers where each layer may provide a particular functionality. For example, the software 1102 includes layers such as an operating system 1104, libraries 1106, frameworks 1108, and applications 1110. Operationally, the applications 1110 invoke application programming interface (API) calls 1112 through the software stack and receive messages 1114 in response to the API calls 1112, consistent with some embodiments.

In various implementations, the operating system 1104 manages hardware resources and provides common services. The operating system 1104 includes, for example, a kernel 1120, services 1122, and drivers 1124. The kernel 1120 acts as an abstraction layer between the hardware and the other software layers consistent with some embodiments. For example, the kernel 1120 provides memory management, processor management (e.g., scheduling), component management, networking, and security settings, among other functionality. The services 1122 can provide other common services for the other software layers. The drivers 1124 are responsible for controlling or interfacing with the underlying hardware, according to some embodiments. For instance, the drivers 1124 can include display drivers, camera drivers, BLUETOOTH® drivers, flash memory drivers, serial communication drivers (e.g., Universal Serial Bus (USB) drivers), WI-FI® drivers, audio drivers, power management drivers, and so forth.

In some embodiments, the libraries 1106 provide a low-level common infrastructure utilized by the applications 1110. The libraries 1106 can include system libraries 1130 (e.g., C standard library) that can provide functions such as memory allocation functions, string manipulation functions, mathematic functions, and the like. In addition, the libraries 1106 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 1106 can also include a wide variety of other libraries 1134 to provide many other APIs to the applications 1110.

The frameworks 1108 provide a high-level common infrastructure that can be utilized by the applications 1110, according to some embodiments. For example, the frameworks 1108 provide various graphic user interface (GUI) functions, high-level resource management, high-level location services, and so forth. The frameworks 1108 can provide a broad spectrum of other APIs that can be utilized by the applications 1110, some of which may be specific to a particular operating system or platform.

In an example embodiment, the applications 1110 include a home application 1150, a contacts application 1152, a browser application 1154, a book reader application 1156, a location application 1158, a media application 1160, a messaging application 1162, a game application 1164, and a broad assortment of other applications such as a third-party application 1166. According to some embodiments, the applications 1110 are programs that execute functions defined in the programs. Various programming languages can be employed to create the applications 1110, structured in a variety of manners, such as object-oriented programming languages (e.g., Objective-C, Java, or C++) or procedural programming languages (e.g., C or assembly language). In a specific example, the third-party application 1166 (e.g., an application developed using the ANDROID™ or IOS™ software development kit (SDK) by an entity other than the vendor of the particular platform) may be mobile software running on a mobile operating system such as IOS™, ANDROID™ WINDOWS® PHONE, or other mobile operating systems. In this example, the third-party application 1166 can invoke the API calls 1112 provided by the operating system 1104 to facilitate functionality described herein.

Example Machine Architecture and Machine-Readable Medium

Figure 12:
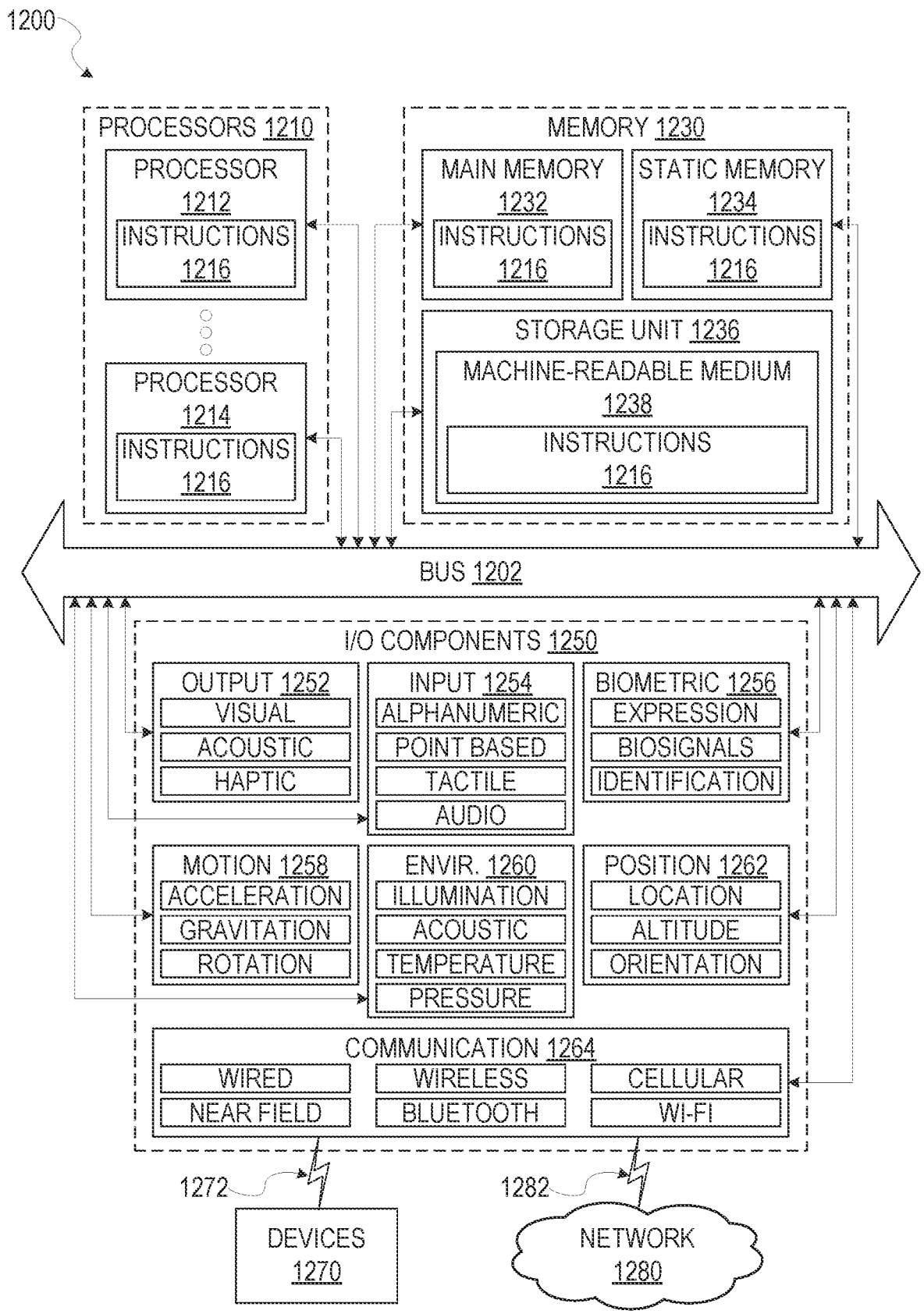
FIG. 12 is a block diagram presenting a diagrammatic representation of a machine in the form of a computer system within which a set of instructions may be executed for causing the machine to perform any of the methodologies discussed herein, according to an example embodiment.

FIG. 12 is a block diagram illustrating components of a machine 1200, according to some embodiments, able to read instructions (e.g., processor-executable instructions) from a machine-readable medium (e.g., a non-transitory machine-readable storage medium) and perform any of the methodologies discussed herein. Specifically, FIG. 12 shows a diagrammatic representation of the machine 1200 in the example form of a computer system, within which instructions 1216 (e.g., software, a program, an application, an applet, an app, or other executable code) for causing the machine 1200 to perform any of the methodologies discussed herein can be executed. In alternative embodiments, the machine 1200 operates as a standalone device or can be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any of the methodologies discussed herein.

In various embodiments, the machine 1200 comprises processors 1210, memory 1230, and I/O components 1250, which can be configured to communicate with each other via a bus 1202. In an example embodiment, the processors 1210 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application-Specific Integrated Circuit (ASIC), a Radio-Frequency Integrated Circuit (RFIC), another processor, or any suitable combination thereof) include, for example, a processor 1212 and a processor 1214 that may execute the instructions 1216. The term "processor" is intended to include multi-core processors that may comprise two or more independent processors (also referred to as "cores") that can execute instructions 1216 contemporaneously. Although FIG. 12 shows multiple processors 1210, the machine 1200 may include a single processor with a single core, a single processor with multiple cores (e.g., a multi-core processor), multiple processors with a single core, multiple processors with multiple cores, or any combination thereof.

The memory 1230 comprises a main memory 1232, a static memory 1234, and a storage unit 1236 accessible to the processors 1210 via the bus 1202, according to some embodiments. The storage unit 1236 can include a machine-readable medium 1238 on which are stored the instructions 1216 embodying any of the methodologies or functions described herein. The instructions 1216 can also reside, completely or at least partially, within the main memory 1232, within the static memory 1234, within at least one of the processors 1210 (e.g., within the processor's cache memory), or any suitable combination thereof, during execution thereof by the machine 1200. Accordingly, in various embodiments, the main memory 1232, the static memory 1234, and the processors 1210 are considered machine-readable media 1238.

As used herein, the term "memory" refers to a machine-readable medium 1238 able to store data temporarily or permanently and may be taken to include, but not be limited to, random-access memory (RAM), read-only memory (ROM), buffer memory, flash memory, and cache memory. While the machine-readable medium 1238 is shown in an example embodiment to be a single medium, the term "machine-readable medium" should be taken to include a single medium or multiple media (e.g., a centralized or distributed database, or associated caches and servers) able to store the instructions 1216. The term "machine-readable medium" shall also be taken to include any medium, or combination of multiple media, that is capable of storing instructions (e.g., the instructions 1216) for execution by a machine (e.g., the machine 1200), such that the instructions, when executed by processors of the machine (e.g., the processors 1210), cause the machine to perform any of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1250 include a wide variety of components to receive input, provide output, produce output, transmit information, exchange information, capture measurements, and so on. In general, it will be appreciated that the I/O components 1250 can include many other components that are not shown in FIG. 12. The I/O components 1250 are grouped according to functionality merely for simplifying the following discussion, and the grouping is in no way limiting. In various example embodiments, the I/O components 1250 include output components 1252 and input components 1254. The output components 1252 include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1254 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1250 include biometric components 1256, motion components 1258, environmental components 1260, or position components 1262, among a wide array of other components. For example, the biometric components 1256 include components to detect expressions (e.g., hand expressions, facial expressions, vocal expressions, body gestures, or mouth gestures), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1258 include acceleration sensor components (e.g., accelerometer), gravitation sensor components, rotation sensor components (e.g., gyroscope), and so forth. The environmental components 1260 include, for example, illumination sensor components (e.g., photometer), temperature sensor components (e.g., thermometers that detect ambient temperature), humidity sensor components, pressure sensor components (e.g., barometer), acoustic sensor components (e.g., microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1262 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 include a network interface component or another suitable device to interface with the network 1280. In further examples, the communication components 1264 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 1270 may be another machine or any of a wide variety of peripheral devices (e.g., a peripheral device coupled via a Universal Serial Bus (USB)).

Moreover, in some embodiments, the communication components 1264 detect identifiers or include components operable to detect identifiers. For example, the communication components 1264 include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1264, such as location via Internet Protocol (IP) geo-location, location via WI-FI® signal triangulation, location via detecting a BLUETOOTH® or NFC beacon signal that may indicate a particular location, and so forth.

Transmission Medium

In various example embodiments, portions of the network 1280 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1216 are transmitted or received over the network 1280 using a transmission medium via a network interface device (e.g., a network interface component included in the communication components 1264) and utilizing any one of a number of well-known transfer protocols (e.g., Hypertext Transfer Protocol (HTTP)). Similarly, in other example embodiments, the instructions 1216 are transmitted or received using a transmission medium via the coupling 1272 (e.g., a peer-to-peer coupling) to the devices 1270. The term "transmission medium" shall be taken to include any intangible medium that is capable of storing, encoding, or carrying the instructions 1216 for execution by the machine 1200, and includes digital or analog communications signals or other intangible media to facilitate communication of such software.

Furthermore, the machine-readable medium 1238 is non-transitory (in other words, not having any transitory signals) in that it does not embody a propagating signal. However, labeling the machine-readable medium 1238 "non-transitory" should not be construed to mean that the medium is incapable of movement; the medium should be considered as being transportable from one physical location to another. Additionally, since the machine-readable medium 1238 is tangible, the medium may be considered to be a machine-readable device.

Language

Throughout this specification, plural instances may implement components, operations, or structures described as a single instance. Although individual operations of methods are illustrated and described as separate operations, individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   receiving, by one or more processors, an image;
   detecting an object of interest within at least a region of interest in the image;
   identifying a bounding box for the object of interest;
   determining a distance between the bounding box and the region of interest;
   comparing the distance to a threshold;
   applying a nonlinear function to compute a score based on a result of comparing the distance to the threshold, the non-linear function comprising a plurality of conditions including a score of neighboring; detections, removal of neighboring; detections and an average precision;
   decaying the score of the bounding box that has a higher measure of overlap with the region of interest than a second bounding box rather than suppressing the score; and
   generating, based on the score of the bounding box, one or more graphical elements within the image to form a modified image.

2. The method of claim 1, further comprising:
   identifying the bounding box for the object of interest using a detector.

3. The method of claim 2, wherein the detector is trained to identify the bounding box by reducing loss between a predicted box for a training image and a ground-truth box of the training image.

4. The method of claim 1, wherein the image is a frame of a video.

5. The method of claim 1, wherein the non-linear function decays scores of bounding boxes linearly based on a measure of overlap in relation to the threshold.

6. The method of claim 5, wherein the nonlinear function applies a sudden penalty to bounding boxes for which the measure of overlap transgresses the threshold.

7. The method of claim 1, further comprising:
   causing presentation of the modified image including the object of interest and the one or more graphical elements.

8. The method of claim 1, further comprising generating an ephemeral message comprising the modified image, the ephemeral message being deleted following a deletion trigger event comprising viewing time or viewing completion.

9. The method of claim 1, wherein the one or more graphical elements comprise a first graphical element positioned proximate to the object of interest in the image and a second graphical element that is animated to interact with the first graphical element.

10. The method of claim 1, further comprising estimating a three-dimensional position of the object of interest based on a scale of the object of interest, wherein the graphical elements have a size based on the scale of the object of interest and a position.

11. The method of claim 10, wherein the three-dimensional position of the object of interest is a first position, and generating the one or more graphical elements further comprises:
    tracking the object of interest within the modified image to identify a position change of the object of interest within the modified image, the position change reflecting movement from the first position to a second position; and
    generating a modified position for the one or more graphical elements in response to the position change of the object of interest, the modified position corresponding to the second position of the object of interest.

12. The method of claim 1, further comprising:
    identifying one or more metadata elements corresponding to the object of interest;
    generating a set of metadata tags corresponding to the one or more metadata elements identified for the object of interest; and
    generating a modified bounding box by associating the set of metadata tags with the bounding box.

13. The method of claim 1, wherein the one or more graphical elements includes an image animated to fill the bounding box, the one or more graphical elements being occluded by the object of interest in the image.

14. The method of claim 1, wherein the one or more graphical elements modify a portion of the object of interest, further comprising:
    generating the one or more graphical elements to have an element context corresponding to at least one metadata tag of a set of metadata tags, the one or more graphical elements being animated or rendered as a background behind the object of interest and comprising a character peeking out from behind the object of interest.

15. The method of claim 1, further comprising:
applying an overlap-based weighting function to compute a measure of overlap; and
applying a continuous penalty function to compute the score in which a relatively high penalty is applied in response to the measure of overlap transgressing the threshold and in which no penalty is applied in response to the measure of overlap falling below the threshold.

16. The method of claim 1, wherein the one or more graphical elements cause a field of view within the image to appear to be lit from an artificial position different from that of a real-world lighting source depicted in the image.

17. A system comprising:
one or more processors; and
a non-transitory processor-readable storage medium storing processor-executable instructions that, when executed by the one or more processors, cause the one or more processors to perform operations comprising:
receiving, by one or more processors, an image;
detecting an object of interest within at least a region of interest in the image;
identifying a bounding box for the object of interest;
determining a distance between the bounding box and the region of interest;
comparing the distance to a threshold;
applying a non-linear function to compute a score based on a result of comparing the distance to the threshold, the non-linear function used to compute the score comprising a plurality of conditions including a score of neighboring detections, removal of neighboring detections and an average precision;
decaying the score of the hounding box that has a higher measure of overlap with the region of interest than a second bounding box rather than suppressing the score; and
generating, based on the score of the bounding box, one or more graphical elements within the image to form a modified image.

18. The system of claim 17, wherein the one or more graphical elements cause a field of view within the image to appear to be lit from an artificial position different from that of a real-world lighting source depicted in the image.

19. The system of claim 17, wherein the neighboring detections are decreased to an extent the neighboring detections have a smaller likelihood of increasing a false positive rate, and wherein the average precision is measured over a range of overlap thresholds.

20. A non-transitory processor-readable storage medium storing processor-executable instructions that, when executed by a processor of a machine, cause the machine to perform operations comprising:
receiving, by one or more processors, an image;
detecting an object of interest within at least a region of interest in the image;
identifying a bounding box for the object of interest;
determining a distance between the bounding box and the region of interest;
comparing the distance to a threshold;
applying a non-linear function to compute a score based on a result of comparing the distance to the threshold, the non-linear function used to compute the score comprising a plurality of conditions including a score of neighboring detections, removal of neighboring detections and an average precision;
decaying the score of the bounding box that has a higher measure of overlap with the region of interest than a second bounding box rather than suppressing the score; and
generating, based on the score of the bounding box, one or more graphical elements within the image to form a modified image.

* * * * *